(12) United States Patent
Mizusaki et al.

(10) Patent No.: US 8,691,350 B2
(45) Date of Patent: Apr. 8, 2014

(54) LIQUID CRYSTAL DISPLAY DEVICE AND MANUFACTURING METHOD THEREFOR

(75) Inventors: Masanobu Mizusaki, Osaka (JP); Youhei Nakanishi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 308 days.

(21) Appl. No.: 13/380,122

(22) PCT Filed: Apr. 28, 2010

(86) PCT No.: PCT/JP2010/003061
§ 371 (c)(1),
(2), (4) Date: Dec. 22, 2011

(87) PCT Pub. No.: WO2011/001579
PCT Pub. Date: Jan. 6, 2011

(65) Prior Publication Data
US 2012/0092603 A1    Apr. 19, 2012

(30) Foreign Application Priority Data
Jun. 29, 2009 (JP) .................. 2009-154166

(51) Int. Cl.
*G02F 1/1337*    (2006.01)
(52) U.S. Cl.
USPC .......... 428/1.2; 428/1.25; 428/1.26; 349/123; 349/124; 349/187; 427/162
(58) Field of Classification Search
USPC ......... 428/1.2, 1.25–1.26; 349/123–136, 187; 427/162
See application file for complete search history.

(56) References Cited

U.S. PATENT DOCUMENTS

| | | | |
|---|---|---|---|
| 6,201,588 B1 * | 3/2001 | Walton et al. ................. | 349/123 |
| 6,939,587 B1 * | 9/2005 | Kumar et al. ................. | 427/510 |
| 2003/0086044 A1 | 5/2003 | Inoue et al. | |
| 2004/0262402 A1 | 12/2004 | Wilderbeek et al. | |
| 2006/0279502 A1 | 12/2006 | Chang | |
| 2009/0146936 A1 | 6/2009 | Ueda et al. | |

FOREIGN PATENT DOCUMENTS

| | | |
|---|---|---|
| JP | 2003-177418 | 6/2003 |
| JP | 2005-509187 | 4/2005 |
| JP | 2006-343719 | 12/2006 |
| JP | 2008-76950 | 4/2008 |
| JP | 2009-139629 | 6/2009 |
| JP | 2010-107537 | 5/2010 |

OTHER PUBLICATIONS

International Search Report for PCT/JP2010/003061, mailed Jun. 8, 2010.

* cited by examiner

*Primary Examiner* — Sophie Hon
(74) *Attorney, Agent, or Firm* — Nixon & Vanderhye, P.C.

(57) ABSTRACT

An object of the present invention is to provide a liquid crystal display device in which a risk of generation of a image sticking is reduced. A liquid crystal display device (100) of the present invention includes a pair of glass substrates (11) and (21), a liquid crystal layer (30) provided between the pair of glass substrates (11) and (21), an alignment layer (23) provided between the liquid crystal layer (30) and at least one of the pair of glass substrates (11) and (21), and an alignment sustaining layer (24) for defining a direction in which liquid crystal molecules constituting the liquid crystal layer (30) are inclined, the alignment sustaining layer (24) being provided between the alignment layer (23) and the liquid crystal layer (30), the alignment layer (23) and the alignment sustaining layer (24) being covalently bound to each other.

13 Claims, 2 Drawing Sheets

LIQUID CRYSTAL DISPLAY DEVICE AND MANUFACTURING METHOD THEREFOR This application is the U.S. national phase of International Application No. PCT/JP2010/003061 filed 28 Apr. 2010 which designated the U.S. and claims priority to JP Patent Application No. 2009-154166 filed 29 Jun. 2009, the entire contents of each of which are hereby incorporated by reference.

TECHNICAL FIELD

The present invention relates to a liquid crystal display device including an alignment sustaining layer, and a method of manufacturing the liquid crystal display device.

BACKGROUND ART

In a liquid crystal display device field, a polymer sustained alignment technique (PSA) has been known as a technique of causing a liquid crystal material to have what is called a pretilt angle, which PSA technique employs a polymer serving as an alignment sustaining layer (see Patent Literature 1). The following description deals with specific details of the PSA technique. The PSA technique employs a liquid crystal material which contains a polymerizable monomer (a material of the alignment sustaining layer), in place of a conventional liquid crystal material. The monomer is polymerized while a voltage is applied to the monomer so that a polymer thus obtained has an alignment direction in which a liquid crystal material is inclined. Note that polymerization reaction of the monomer is initiated with the use of a polymerization initiator which has been added to a liquid crystal layer.

It has been reported in Patent Document 1 that, by using the PSA technique, it is possible to increase a response speed and a transmittance, as compared with a multi-domain vertical alignment mode (MVA) which does not employ the PSA.

CITATION LIST

Patent Literature
Patent Literature 1
Japanese Patent Application Publication, Tokukai, No. 2003-177418 A (Publication Date: Jun. 27, 2003)

SUMMARY OF INVENTION

Technical Problem

However, the PSA technique or a technique obtained by combining the PSA technique with the multi-domain technique (such as a 4D-PSA technique in which 4 multi-domains are provided) has a problem of generation of image sticking which is caused electrically or caused due to a change in pretilt angle. Particularly, in a case where the image sticking is generated due to a change in pretilt angle, such a change is generated in a significantly complicated manner due to, probably, a plurality of causes. For this reason, there has been no successful improvement in prevention of the generation of image sticking caused by a change in pretilt angle. Further, image sticking is also generated electrically because the polymerization reaction of the monomer is carried out by irradiation of light whose wavelength is within a relatively short-wavelength region (e.g., an ultraviolet ray having a relatively short wavelength (a wavelength of not more than 330 nm)). Furthermore, in a case where the polymerization initiator added to the liquid crystal material layer remains in the liquid crystal material layer, image sticking is generated electrically due to interaction between a radical of the polymerization initiator and the liquid crystal material.

In the PSA technique, occurrence of a change in pretilt angle, which generates image sticking, is assumed to be caused mainly for the following reasons. First, a pretilt angle may be changed with application of an AC (alternating current) voltage because the pretilt angle which mainly depends on an alignment sustaining layer is unstable. In a case where a concentration of the monomer which is a material of the alignment sustaining layer is low, the alignment sustaining layer has a small thickness. In this case, the alignment layer (particularly, a property of a side chain of the alignment layer) has a significant influence on the pretilt angle. Accordingly, the aforementioned phenomenon is likely to occur.

In order to avoid such a problem, a monomer having a high resolvability with respect to the liquid crystal material can be used so as to increase the concentration of the monomer in the liquid crystal material. However, the higher the dissolvability of the monomer with respect to the liquid crystal material becomes, the harder it becomes to carry out phase separation of a polymerization reaction product from the liquid crystal material. In other words, it becomes difficult to form the alignment sustaining layer. Accordingly, there is a risk that the liquid crystal material might be used as a display while a polymer or an oligomer (polymerization reaction product), dissolved in the liquid crystal material, has a high concentration. Further, the higher the concentration of the monomer in the liquid crystal material becomes, the longer a time period required for completion of the polymerization reaction of the monomer becomes. Accordingly, there is a risk that the liquid crystal material might be used as a display while an unreacted monomer remains in the liquid crystal material.

If the liquid crystal material is used as a display while the monomer, the polymer, and the oligomer, each of which is a material of the alignment sustaining layer, remains in the liquid crystal material, the following problem would occur. That is, irradiation of light from a backlight of the display or the like causes the polymerization of the monomer to be developed, and also causes further polymerization of the polymer and the oligomer thus generated to be developed. This forms an undesirable alignment sustaining layer. Moreover, in a case where the formation of such an undesirable alignment sustaining layer is developed due to irradiation of light from the backlight or the like, counterreaction (i.e., the monomer, the polymer, and the oligomer are separated out from the alignment sustaining layer into the liquid crystal layer) is also developed. That is, the formation of the undesirable alignment sustaining layer and the dissolution of the alignment sustaining layer are developed simultaneously, so that (i) the pretilt angle is changed and (ii) this generates image sticking.

Solution to Problem

In order to attain the object, a liquid crystal display device of the present invention includes: a liquid crystal layer provided between a pair of substrates; an alignment layer; and an alignment sustaining layer for defining a direction in which liquid crystal molecules are inclined, the alignment sustaining layer being provided between the alignment layer and the liquid crystal layer, the alignment layer and the alignment sustaining layer being covalently bound to each other.

According to the arrangement, the alignment layer and the alignment sustaining layer are strongly bound to each other via covalent binding. Accordingly, it is possible to prevent the alignment sustaining layer from (i) being dissolved undesirably and (ii) being subjected to reformation undesirably. As a result, a pretilt angle of the liquid crystal molecules is not likely to be changed substantially during a time period in which the liquid crystal display device is used. It is therefore possible to suppress generation of image sticking due to a change in pretilt angle.

In order to attain the object, a method of the present invention, for manufacturing a liquid crystal display device including a liquid crystal layer provided between a pair of substrates, an alignment layer, and an alignment sustaining layer for defining a direction in which liquid crystal molecules are inclined, includes the steps of: causing a monomer component for forming the alignment sustaining layer and the alignment layer to be in contact with each other, the alignment layer containing a polymerization initiator functional group for initiating polymerization reaction of the monomer component; and forming the alignment sustaining layer between the alignment layer and the liquid crystal layer by carrying out the polymerization of the monomer component so that the alignment sustaining layer and the alignment layer are covalently bound to each other.

According to the method, the alignment layer and the alignment sustaining layer are strongly bound to each other via covalent binding. Accordingly, it is possible to prevent the alignment sustaining layer from (i) being dissolved undesirably and (ii) being subjected to reformation undesirably. As a result, a pretilt angle of the liquid crystal molecules is not likely to be changed substantially. It is therefore possible to manufacture a liquid crystal display device in which generation of image sticking due to a change in pretilt angle is suppressed. In addition, unlike an arrangement in which a polymerization initiator for initiating the polymerization reaction of the monomer component is mixed in the liquid crystal molecules, there is no risk that the polymerization initiator might remain in the liquid crystal layer of the present invention. It is therefore possible to manufacture a liquid crystal display device in which there is no risk that image sticking might be generated electrically due to interaction between a radical contained in the polymerization initiator and a liquid crystal material.

Advantageous Effects of Invention

According to the present invention, it is possible to provide (i) a liquid crystal display device in which generation of image sticking due to a change in pretilt angle is suppressed and (ii) a method of manufacturing the liquid crystal display device. In addition, according to the present invention, it is possible to provide (i) a liquid crystal display device in which a risk that image sticking might be generated electrically is suppressed and (ii) a method of manufacturing the liquid crystal display device.

BRIEF DESCRIPTION OF DRAWINGS

FIG. 1 is a cross-sectional view schematically illustrating an arrangement of a liquid crystal display device of the present invention.

FIG. 2 is an explanatory view illustrating an example of a pixel structure of the liquid crystal display device of the present invention.

DESCRIPTION OF EMBODIMENTS

Figure 1:
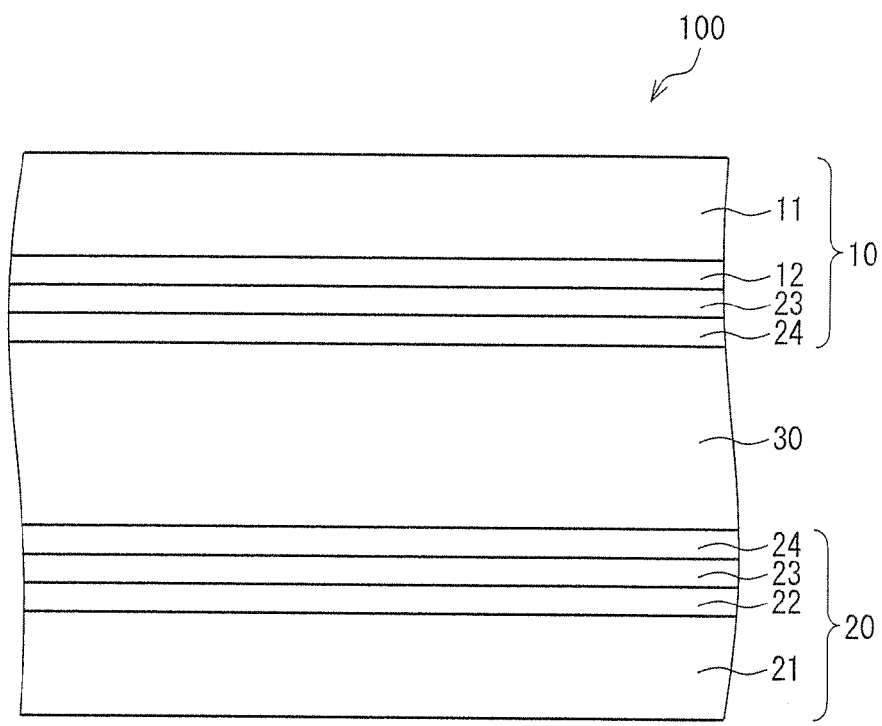
FIG. 1

A liquid crystal display device of the present invention includes a liquid crystal layer provided between a pair of substrates, an alignment layer, and an alignment sustaining layer for defining a direction in which liquid crystal molecules are inclined, which alignment sustaining layer being provided between the alignment layer and the liquid crystal layer. The alignment layer and the alignment sustaining layer are covalently bound to each other.

In addition to the arrangement, the liquid crystal display device of the present invention can be arranged such that the liquid crystal layer is a vertical alignment liquid crystal layer.

According to the arrangement, the liquid crystal display device employs an alignment layer for a vertical alignment mode, which is subjected to no rubbing process generally. As compared with other alignment layers, such a vertical alignment layer has a higher possibility that (i) the alignment sustaining layer is dissolved or subjected to reformation undesirably and (ii) this has an adverse effect on sustainment of alignment of liquid crystal molecules. Accordingly, with the arrangement, it is possible to have a more significant effect of suppressing the undesirable dissolution of the alignment sustaining layer by causing the vertical alignment layer and the alignment sustaining layer to be covalently bound to each other, as compared with an arrangement employing another alignment layer.

In addition to the arrangement, the liquid crystal display device of the present invention can be arranged such that the alignment sustaining layer is made from a polymer having a cross-linked structure. According to the arrangement, it is possible to further suppress the undesirable dissolution of the alignment sustaining layer. Accordingly, it is possible to further suppress generation of image sticking.

Further, the alignment sustaining layer can be formed by polymerizing a monomer component containing a monomer represented by the following general formula (1):

[Chemical Formula 1]

(1)

(wherein: $P^1$ and $P^2$ represent an acrylate group, a methacrylate group, an acrylamide group, a methacrylamide group, a vinyl group, a vinyloxy group, or an epoxy group, independently; $A^1$ and $A^2$ represent a 1,4-phenylene group, a naphthalene-2,6-diyl group, a group in which a part of carbon atoms is substituted by a hetero atom(s) in the 1,4-phenylene group, or a group in which a part of carbon atoms is substituted by a hetero atom(s) in the naphthalene-2,6-diyl group, independently; a hydrogen atom(s) may be substituted by a halogen atom(s) (preferably, a fluorine atom(s)) or a methyl group in any one of the 1,4-phenylene group, the naphthalene-2,6-diyl group, the group in which a part of carbon atoms is substituted by a hetero atom(s) in the 1,4-phenylene group, and the group in which a part of carbon atoms is substituted by a hetero atom(s) in the naphthalene-2,6-diyl group; $Z^1$ represents —COO—, —OCO—, —O—, —NHCO—, or direct binding between $A^1$ and $A^2$; $S^1$ and $S^2$ represent —$(CH_2)_m$—, —$(CH_2—CH_2—O)_m$—, direct binding between $P^1$ and $A^1$ (in the case of $S^1$), or direct binding between $P^2$ and $A^2$ (in the case of $S^2$), independently, where m is an integer of not less than 1 but not more than 6; and n is 0, 1, or 2).

Note that the hetero atom may be selected from, for example, the group consisting of an oxygen atom, a nitrogen atom, and a sulfur atom. In a case where (i) n is 2 and (ii) $Z^1$ represents the direct binding between $A^1$ and $A^2$, a chemical formula represented by the general formula (1) becomes such a structure that $P^1$, $P^2$, $A^1$, $A^2$, $S^1$, and $S^2$ are bound to each other in the following order: $P^1$—$S^1$-$A^1$-$A^2$-$A^2$-$S^2$—$P^2$.

Further, the alignment sustaining layer can be formed by polymerizing a monomer component containing (i) a monomer represented by the general formula (1), wherein: in the general formula (1), both $P^1$ and $P^2$ represent a methacrylate group or an acrylate group; $Z^1$ represents direct binding between $A^1$ and $A^2$; and n is 0 or 1, or (ii) a monomer represented by the general formula (1), wherein: $A^1$ is selected from the group consisting of a 1,4-phenylene group, a 2-fluoro-1,4-phenylene group, a 2,3-difluoro-1,4-phenylene group, a 2,6-difluoro-1,4-phenylene group, a naphthalene-2,6-diyl group, a 3,4,5-trifluoronaphthalene-2,6-diyl group, and a group in which, in any one of the aforementioned groups, a part of carbon atoms is substituted by a nitrogen atom(s) serving as a hetero atom(s).

In addition to the arrangement, the liquid crystal display device of the present invention can be arranged such that the alignment layer is made from a vertical alignment polyimide or a vertical alignment polyamic acid.

Further, the liquid crystal display device of the present invention is preferably arranged such that (i) the vertical alignment polyimide or the vertical alignment polyamic acid has a polymerization initiator functional group which has a function of initiating polymerization reaction of the monomer component for forming the alignment sustaining layer and (ii) the polymerization initiator functional group and the monomer component are covalently bound to each other.

With the arrangement, unlike an arrangement in which the polymerization initiator for initiating polymerization reaction of the monomer component is mixed in the liquid crystal molecules, there is no risk that the polymerization initiator might remain in the liquid crystal layer. Accordingly, there is no risk that image sticking might be generated electrically due to interaction between a radical contained in the polymerization initiator and the liquid crystal material.

Further, the liquid crystal display device of the present invention is preferably arranged such that the polymerization initiator functional group generates a radical by being irradiated with light having a wavelength of more than 330 nm but not more than 400 nm, so as to initiate the polymerization reaction of the monomer component. For example, the liquid crystal display device of the present invention is preferably arranged such that the vertical alignment polyimide or the vertical alignment polyamic acid has, as the polymerization initiator functional group, both an amine and an aromatic ketone.

With the arrangement, it becomes possible to carry out polymerization of the monomer component with light having relatively weak energy intensity. Accordingly, it is possible to reduce a risk of, for example, dissolution of components constituting the liquid crystal display device, other than the monomer component.

The liquid crystal display device of the present invention can be arranged such that the vertical alignment polyimide or the vertical alignment polyamic acid contains a photoreactive functional group for causing, by being irradiated with light, the liquid crystal molecules constituting the liquid crystal layer to be aligned in a predetermined direction. The photoreactive functional group can be at least one sort selected from the group consisting of a cinnamate group, a chalkone group, a tolan group, a coumarin group, and an azobenzene group.

Further, the vertical alignment polyimide or the vertical alignment polyamic acid can be represented by the following general formula (2) or (3):

[Chemical Formula 2]

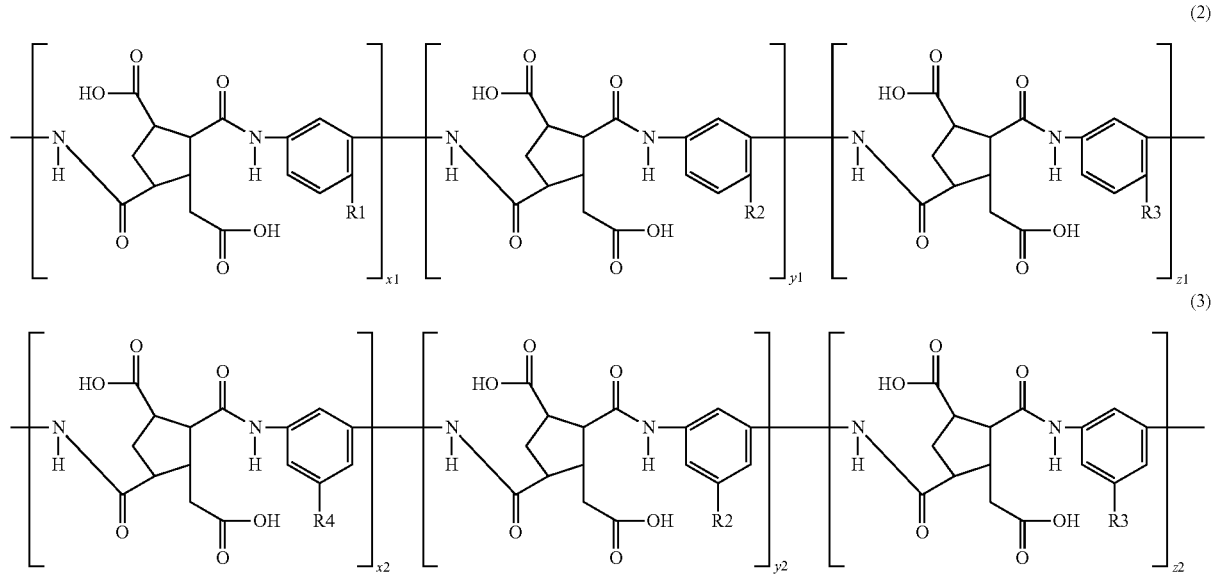

(wherein: R1 and R4 independently represent a photoreactive functional group or a vertical alignment functional group for causing liquid crystal molecules to be subjected to vertical alignment; R2 and R3 represent different polymerization initiator functional groups, respectively; x1, x2, y1, y2, z1, and z2 independently represent the number of corresponding repeat units, which number is not less than 1; a carboxy group contained in each repeat unit may be imidized at a predetermined ratio (within a range of 0% to 100%); and repeat units of different sort may be arranged randomly).

The liquid crystal display device of the present invention can be arranged such that the alignment layer and the alignment sustaining layer control the liquid crystal molecules so that the liquid crystal molecules are inclined with respect to a direction of a normal line of a main surface of the alignment layer while no voltage is applied to the liquid crystal layer.

The liquid crystal display device of the present invention can be arranged such that each of a plurality of pixels has a plurality of domains, and the plurality of domains are different from each other in reference alignment azimuth direction of the liquid crystal molecules while (i) a voltage is applied to the liquid crystal layer or (ii) no voltage is applied to the liquid crystal layer. Further, the number of the plurality of domains, included in each of the plurality of pixels, is 4.

A method of the present invention, for manufacturing a liquid crystal display device including a liquid crystal layer provided between a pair of substrates, an alignment layer, and an alignment sustaining layer for defining a direction in which liquid crystal molecules are inclined, includes the steps of: (i) causing a monomer component for forming the alignment sustaining layer and the alignment layer to be in contact with each other, which alignment layer has a polymerization initiator functional group having a function of initiating polymerization reaction of the monomer component; and (ii) forming the alignment sustaining layer between the alignment layer and the liquid crystal layer by carrying out the polymerization reaction of the monomer component so that the alignment sustaining layer and the alignment layer are covalently bound to each other.

In addition to the arrangement, the method of the present invention, for manufacturing a liquid crystal display device, can be arranged such that the monomer component is dissolved in the liquid crystal molecules constituting the liquid crystal layer. Further, in addition to the arrangement, the method of the present invention, for manufacturing a liquid crystal display device, can be arranged such that the polymerization reaction of the monomer component is initiated by irradiation of light.

The following description deals with embodiments of the present invention more specifically.

[Embodiment 1]

(Liquid Crystal Display Device)

FIG. 1 is a cross-sectional view schematically illustrating an arrangement of a liquid crystal display device 100 of the present embodiment. Schematically, the liquid crystal display device 100 has an arrangement in which (i) a counter substrate 10 and an active matrix substrate 20 face each other and a liquid crystal layer 30 is sandwiched between them. Here, the counter substrate 10 has an arrangement in which a counter electrode 12, a first alignment layer (i.e., an alignment film) 23, and a first alignment sustaining layer 24 are provided on a surface of a glass substrate 11 in this order. Further, an active matrix substrate 20 has an arrangement in which a pixel electrode 22, a second alignment layer 23, and a second alignment sustaining layer 24 are provided on a surface of a glass substrate 21 in this order. The first alignment sustaining layer 24 of the counter substrate 10 and the second alignment sustaining layer 24 of the active matrix substrate 20 face each other via the liquid crystal layer 30. In the liquid crystal display device 100, the first alignment layer 23 and the first alignment sustaining layer 24 of the counter substrate 10 are covalently bound to each other, and the first alignment layer 23 and the first alignment sustaining layer 24 of the active matrix substrate 20 are covalently bound to each other. Note that each of the first and second alignment sustaining layers 24 is a layer which defines, in combination with a corresponding one of the first and second alignment layer 23, a direction in which liquid crystal molecules constituting the liquid crystal layer 30 are inclined. Here, the direction in which the liquid crystal molecules are inclined is (i) a direction in which the liquid crystal molecules are inclined along a pretilt angle while no voltage is applied to the liquid crystal layer 30 or (ii) a direction in which the liquid crystal molecules are inclined while liquid crystal driving is carried out (a voltage is applied to the liquid crystal layer 30).

In other words, the liquid crystal display device 100 includes the pair of glass substrates (substrates) 11 and 21, the liquid crystal layer 30 provided between the substrates 11 and 21, the first alignment layer 23 provided between the liquid crystal layer 30 and the substrate 11, the second alignment layer provided between the liquid crystal layer and the substrate 21, the first alignment sustaining layer 24 provided between the liquid crystal layer 30 and the first alignment layer 23, and the second alignment sustaining layer 24 provided between the liquid crystal layer and the second alignment layer 23. The first alignment layer 23 and the first alignment sustaining layer 24, adjacent to each other, are covalently bound to each other, while the second alignment layer 23 and the second alignment sustaining layer 24 are covalently bound to each other.

One of features of the present invention is that an alignment layers 23 and an alignment sustaining layers 24 are covalently bound to each other. This makes it possible for the liquid crystal display device 100 to have a reduction in risk that (i) a monomer which is a component of the alignment sustaining layer 24, (ii) a polymer of the monomer, and (iii) an oligomer of the monomer might be decomposed and be dissolved in the liquid crystal layer 30. Further, since the dissolution of the monomer, the polymer, and the oligomer is suppressed, it is possible to reduce a risk that these monomer, polymer, and oligomer might be subjected to polymerization reaction again and be bound to the alignment sustaining layer 24, during a time period in which the liquid crystal display device 100 is used. That is, with the arrangement, undesirable dissolution of the alignment sustaining layers 24 and undesirable reformation of the alignment sustaining layers 24 is suppressed. For this reason, the pretilt angle of the liquid crystal molecules is not likely to be changed substantially during the time period in which the liquid crystal display device 100 is used. Accordingly, generation of image sticking due to change in pretilt angle is suppressed.

Note that a sort of the liquid crystal molecules, a sort of the alignment layer, and a sort of a driving mode of the liquid crystal molecules are not particularly limited, provided that the liquid crystal display device 100 includes the alignment layer and the alignment sustaining layer, which cause the liquid crystal molecules to be aligned in a predetermined direction. More specifically, for example, it is possible to select liquid crystal molecules and an alignment layer from a wide variety of liquid crystal molecules and alignment layers, such as liquid crystal molecules and an alignment layer used in a vertical alignment (VA) mode, a twisted nematic (TN) mode, or an in-plane switching (IPS) mode. Furthermore, as to arrangements other than the liquid crystal molecules and the alignment layer, it is possible to use appropriate arrangements in accordance with the driving mode thus employed. Note that, among the driving modes described above, the vertical alignment mode realizes the aforementioned effects of the liquid crystal display device 100 most significantly. This is because (i) a vertical alignment liquid crystal layer and a vertical alignment layer are exclusively used for the vertical alignment mode, (ii) generally, such a vertical alignment layer is not subjected to a rubbing process, (iii) it is therefore particularly preferable to provide, for the vertical alignment mode, an alignment sustaining layer in sufficient amount to sustain the alignment of the liquid crystal molecules, and (iv), as a result, the vertical alignment mode has, as compared with other driving modes, a higher risk that undesirable dissolution of the alignment sustaining layer and undesirable reformation of the alignment sustaining layer might be caused, and this might have an adverse effect on the sustainment of the alignment of the liquid crystal molecules.

Further, in the liquid crystal display device 100, the direction which direction in which the liquid crystal molecules are inclined is not particularly limited, which direction is defined by the alignment layers 23 and the alignment sustaining layers 24. Note, however, that it is preferable to control the liquid crystal molecules so that a long axis of each of the liquid crystal molecules is inclined at a predetermined angle with respect to a direction of a normal line of a main surface of the alignment layer 23 (i.e., inclined at a pretilt angle with respect to a direction vertical to the alignment layer) while no voltage is applied to the liquid crystal layer 30. In a case where the liquid crystal molecules are caused to have a pretilt angle in accordance with the vertical alignment mode as described above, (i) the liquid crystal display device 100 improved in response speed, and (ii), since it is unnecessary to provide a rib or the like, the liquid crystal display device 100 is increased in transparency and the arrangement of the liquid crystal display device 100 is simplified. Further, the liquid crystal molecules are caused to have a pretilt angle with the use of the alignment sustaining layer. This significantly reduces, as compared with the arrangement having no alignment sustaining layer, generation of image sticking due to (i) a change in tilt angle and (ii) electricity. Furthermore, in a case where the alignment layer and the alignment sustaining layer are bound to each other chemically, a monomer or a low-molecular-weight polymer, constituting the alignment sustaining layer, is not likely to be dissolved in the liquid crystal layer. This further prevents generation of image sticking.

Figure 2:
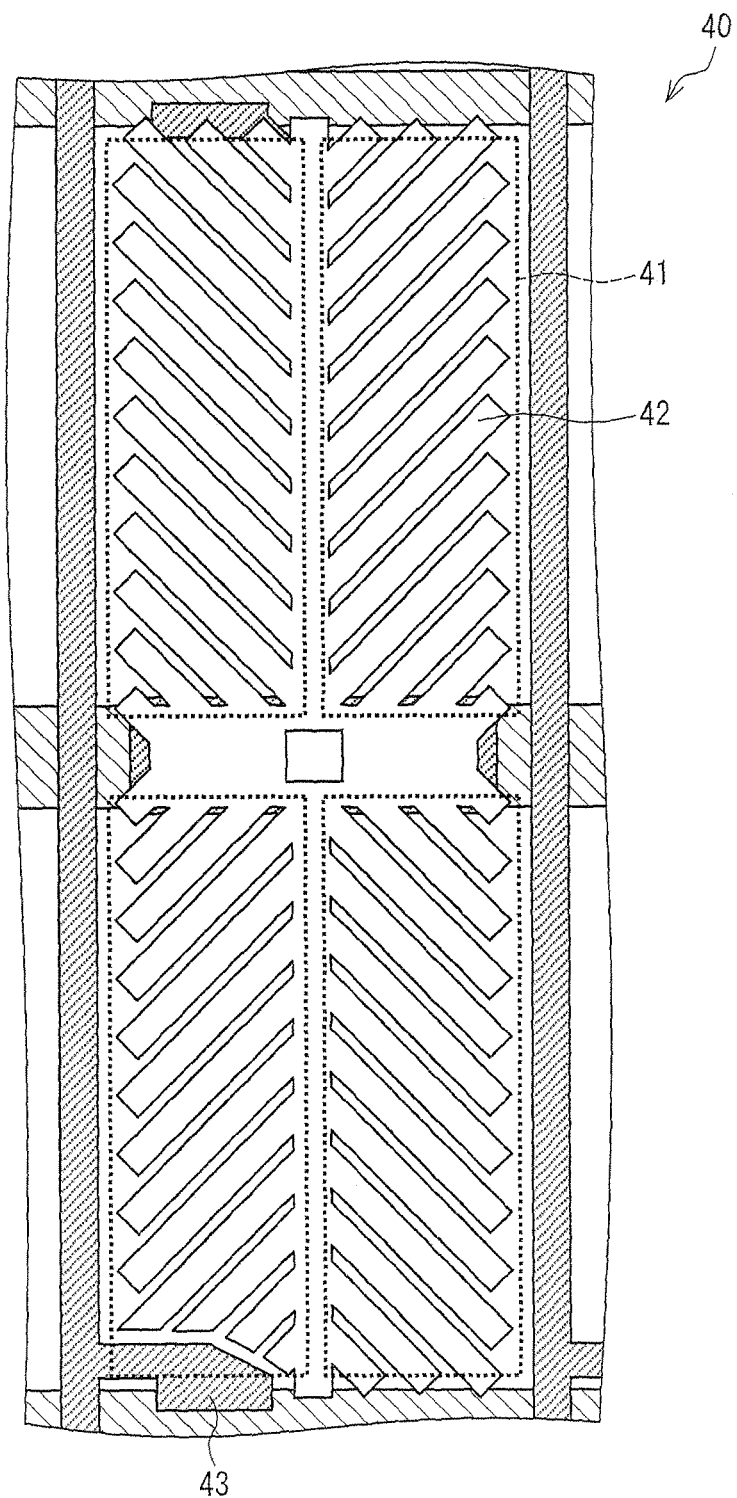
FIG. 2

Moreover, the liquid crystal display device 100 includes a plurality of pixels 40 as illustrated in FIG. 2 (note that FIG. 2 shows a single pixel). It is preferable that each of the plurality of pixels 40 includes a plurality of domains 41 which are different from each other in reference alignment azimuth direction in which the liquid crystal molecules constituting the liquid crystal layer 30 are inclined while (i) no voltage is applied to the liquid crystal layer 30 or (ii) a voltage is applied to the liquid crystal layer 30. In other words, it is preferable to employ what is called a multi-domain mode, more preferably a multi-domain vertical alignment mode. This is because the multi-domain mode including the multi-domain vertical alignment mode can improve a viewing angle characteristic. Here, the number of the plurality of domains 41 for the liquid crystal display, provided in each of the plurality of pixels 40, is not particularly limited. The number of the plurality of domains 41 in each of the plurality of pixels 40 may be 4, for example (as illustrated in FIG. 2). Note that FIG. 2 illustrates, as an example, an arrangement of each of the plurality of pixels 40, in which a thin-film transistor 43, and an electrode 42 having a comb-like shape are provided, which electrode 42 serves as a pixel electrode 22.

Examples of a specific compound used as a material of the alignment layer and examples of a specific compound used as a material of the alignment sustaining layer will be described in the following [Method of manufacturing liquid crystal display device], and the following Examples.

[Method of Manufacturing Liquid Crystal Display Device]

The following description specifically deals with an example of a method of manufacturing the liquid crystal display device 100 illustrated in FIG. 1.

As described above, one of the features of the liquid crystal display device 100 is such that the alignment layer and the alignment sustaining layer 24, which are adjacent to each other, are covalently bound to each other. This structure can be manufactured by a manufacturing method which includes the steps of (i) causing a monomer component for forming the alignment sustaining layer 24 and the alignment layer 23 which has a polymerization initiator functional group having a function of initiating polymerization reaction of the monomer component to be contact with each other, and then (ii) forming, between the alignment layer 23 and the liquid crystal layer 30, the alignment sustaining layer 24 by carrying out the polymerization reaction of the monomer component so that the alignment sustaining layer 24 and the alignment layer 23 are covalently bound to each other.

As a specific example of the manufacturing method, first, the followings are prepared: (i) a counter substrate 10 having an arrangement in which a counter electrode 12 and a first alignment layer 23 are provided on a surface of a glass substrate 11 in this order, and (ii) an active matrix substrate 20 having an arrangement in which a pixel electrode 22 and a second alignment layer 23 are provided on a surface of a glass substrate 21 in this order.

Then, the counter substrate 10 and the active matrix substrate 20 are attached to each other so that the first alignment layer 23 and the second alignment layer 23 face each other with a predetermined gap between them. Further, a mixture of liquid crystal molecules and the monomer component described above is provided in the gap. Here, an example of the mixture of the liquid crystal molecules and the monomer component may be such a mixture that the monomer component is dissolved in the liquid crystal molecules constituting the liquid crystal layer.

Next, the polymerization reaction of the monomer component is carried out by an appropriate method in accordance with a sort of the monomer component and a sort of the polymerization initiator functional group (e.g., external irradiation of light or supply of thermal energy), so that the first (second) alignment sustaining layer 24 which is covalently bound to the first (second) alignment layer 23 is formed between the first (second) alignment layer 23 and the liquid crystal layer 30.

The first and second alignment layers 23 each having the polymerization initiator functional group having the function of initiating the polymerization reaction of the monomer component can be produced by, for example, providing the polymerization initiator functional group into a structure known as the alignment layer (which structure may be, but not limited to, a polyimide structure, a polyamic acid structure, a polysiloxane structure, or a polyvinyl structure). Here, the provision of the polymerization initiator functional group can be carried out after the structure known as the alignment layer is formed or at the same time as formation of such a structure (that is, a monomeric component which is known as a material of an alignment layer and a monomeric component containing a polymerization initiator functional group are mixed with each other and then polymerized). In view of handiness in the manufacturing process, it is preferable to carry out the provision of the polymerization initiator functional group at the same time as the formation of such a known structure.

Further, examples of the material of the first and second alignment layers encompass a vertical alignment polyimide and a vertical alignment polyamic acid, each of which has (i) a polymerization initiator functional group having a function of initiating the polymerization reaction of the monomer component and (ii) an arrangement in which the polymerization initiator functional group and the monomer component are covalently bound to each other. Further, the vertical alignment polyimide can contain a photoreactive functional group for causing, by being irradiated with light, the liquid crystal molecules constituting the liquid crystal layer to be aligned in a predetermined direction (i.e., causing, by being irradiated with light, the liquid crystal molecules to have a pretilt angle). Here, as the photoreactive functional group, a known material of what is called a photo-alignment layer is used. It is preferable that the photoreactive functional group is at least one sort selected from the group consisting of a cinnamate group, a chalkone group, a tolan group, a coumarin group, and an azobenzene group.

Further, it is preferable that the polymerization initiator functional group initiates the polymerization reaction of the monomer component by generating a radical by being irradiated with ultraviolet radiation having a wavelength of more than 330 nm but not more than 400 nm. It is more preferable that the polymerization initiator functional group initiates the polymerization reaction of the monomer component by being irradiated with an ultraviolet ray having a wavelength of not less than 360 nm but not more than 400 nm. An example of such a polymerization initiator functional group may be, for example, a group which includes, at its terminal, an aromatic ketone or an amine. More specifically, for example, the polymerization initiator functional group may be a functional group containing, at its terminal, an aromatic ketone or an aromatic amine, each of which is represented by the following formula (4). Further, more specifically, the polymerization initiator functional group may be a polymerization initiator functional group contained in a compound (12) and a compound (13) which will be described in the following Examples.

[Chemical Formula 3]

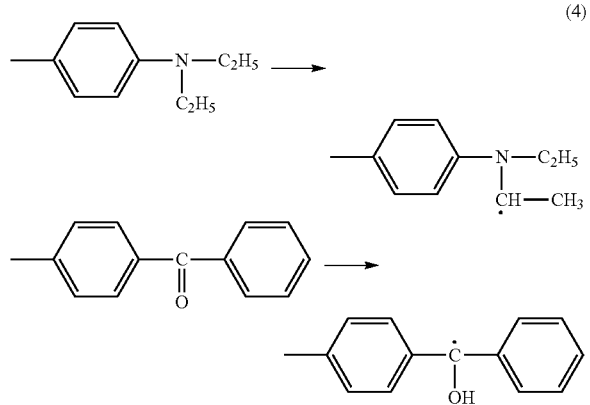

(4)

Note that, in the above general formula (4), each of chemical formulas on the left side with respect to arrows shows a state where the polymerization initiator functional group has not been irradiated with the ultraviolet ray, whereas each of chemical formulas on the right side with respect to the arrows shows a state where the polymerization initiator functional group has generated a radical by being irradiated with the ultraviolet ray.

It is particularly preferable that the alignment layer of the present invention (i) contains, as the polymerization initiator functional group, both the group which contains, at its terminal, the aromatic ketone, and the group which contains, at its terminal, the amine (which may be an aromatic amine), and (ii) generates a radical by use of combination of these groups.

Preferable examples of the alignment layer of the present invention encompass an alignment layer represented by the aforementioned general formula (2) and an alignment layer represented by the aforementioned general formula (3). In the general formulas (2) and (3), a ratio at which a carboxyl group contained in each repeat unit is imidized is not particularly limited. However, in view of (i) prevention of generation of image sticking due to electricity, (ii) securing of high alignment stability, and (iii) securing of a high voltage holding ratio, it is preferable that the ratio at which the carboxyl group is imidized is more than 0%, more preferably, not less than 50%. Further, a ratio of three sorts of repeat unit in the general formula (2) is not particularly limited, provided that the alignment layer satisfies an alignment characteristic and a property of the polymerization initiator which are required for the alignment layer of the present invention. However, it is preferable that x1:(y1+z1) is in a range of 1:1 to 99:1, more preferably, in a range of 9:1 to 19:1. Note that, in any cases, it is preferable that y1:z1 is substantially equal to 1:1. As to a ratio of three sorts of repeat unit in the general formula (3), it is preferable to set x2:(y2+z2) to be in a range of 1:1 to 99:1, more preferably, in a range of 9:1 to 19:1, in the same manner as the general formula (2). Note that, in any cases, it is preferable that y2: z2 is substantially equal to 1:1. In the general formula (2), x1, y1, and z1 indicate the number of corresponding repeat units, independently, which are contained in the polymer, which number is not less than 1. In the general formula (3), x2, y2, and z2 indicate the number of corresponding repeat units, independently, which are contained in the polymer, which number is not less than 1. Further, it is preferable that (i) a value of x1+y1+z1, indicating a degree of polymerization (a total number of repeat units contained in the polymer), is not less than 10 but not more than 1000, and (ii) a value of x2+y2+z2, indicating a degree of polymerization (a total number of repeat units contained in the polymer), is not less than 10 but not more than 1000.

Further, it is preferable that a weight-average molecular weight of the material of the alignment layer, represented by either the general formula (2) or (3), is not less than 3000 but not more than 1,000,000, more preferably, not less than 10,000 but not more than 100,000. Furthermore, in either the general formula (2) or (3), an arrangement of three sorts of repeat unit is not particularly limited. For example, the material can be a random copolymer, a block copolymer, or the like.

According to the present invention, the alignment sustaining layer can be manufactured by, for example, appropriately polymerizing, by use of the polymerization initiator functional group contained in the alignment layer, a monomer component which is a known material for forming the alignment sustaining layer. A monomer contained in the monomer component may be one sort or a mixture of two or more sorts of monomer. Further, in order to increase stability of the alignment sustaining layer, it is preferable that the alignment sustaining layer is made from a polymer having a cross-linked structure. Note that, in order to form a polymer having a cross-linked structure, it is necessary for the monomer component to contain at least one sort of bifunctional monomer (that is, a monomer having two functional groups which are involved in the polymerization reaction). Note, however, that the monomer contained in the monomer component is not limited to the bifunctional monomer.

An example of a monomer which is suitably used in formation of the alignment sustaining layer may be a monomer component containing a monomer represented by the aforementioned general formula (1). As to the monomer represented by the general formula 1, it is particularly preferable to use (i) the monomer represented by the general formula (1), wherein: both $P^1$ and $P^2$ indicate a methacrylate group; $Z^1$ indicates direct binding between $A^1$ and $A^2$; and n is 0 or 1, or (ii) the monomer represented by the general formula (1), wherein: $A^1$ indicates a 1,4-phenylene group or a naphthalene-2,6-dyil group. Such a monomer can be easily polymerized by being irradiated with an ultraviolet ray and can be mixed with and dissolved in the liquid crystal molecules relatively efficiently.

Further, in a case where the monomer component is provided as a mixture of the monomer component and the liquid crystal molecules, it is more preferable that a ratio of the monomer component in the mixture is not less than 0.05% by mass but not more than 2.5% by mass.

As described above, according to the present invention, the polymerization reaction of the monomer component for forming the alignment sustaining layer is carried out by use of the polymerization initiator functional group which is contained in the alignment layer. Accordingly, unlike a method in which a mixture of a monomer component, a polymerization initiator, and liquid crystal molecules is provided, it is possible to prevent the polymerization initiator from remaining in the liquid crystal molecules. As a result, there is no risk that image sticking might be generated electrically due to interaction between a radical contained in the polymerization initiator and the liquid crystal material.

[Other Embodiments]

The liquid crystal display device 100 illustrated in FIG. 1 has an arrangement in which the first alignment layer 23 and the first alignment sustaining layer 24 are covalently bound to each other on the counter substrate 10, while the second alignment layer 23 and the second alignment sustaining layer 24 are also covalently bound to each other on the active matrix substrate 20. Note, however, that the liquid crystal display device of the present invention is not limited to this, provided that at least one of (i) the pair of the first alignment layer and the first alignment sustaining layer and (ii) the pair of the second alignment layer and the second alignment sustaining layer are covalently bound to each other chemically.

The liquid crystal display device of the present invention can include an active matrix substrate having a pixel electrode, a counter substrate having a counter electrode, a vertical alignment liquid crystal layer provided between the active matrix substrate and the counter substrate, a first alignment layer provided between the counter substrate and the liquid crystal layer, a second alignment layer provided between the active matrix substrate and the liquid crystal layer, a first alignment sustaining layer provided between the first alignment layer and the liquid crystal layer, and a second alignment sustaining layer provided between the second alignment layer and the liquid crystal layer. The first alignment layer and the first alignment sustaining layer may be chemically bound to each other, and the second alignment layer and the second alignment sustaining layer may be chemically bound to each other. Such chemical binding may be covalent binding.

A method of the present invention, for manufacturing a liquid crystal display device, may include the steps of (i) preparing an active matrix substrate and a counter substrate, and forming (a) a liquid crystal layer between the active matrix substrate and the counter substrate, (b) a first alignment layer between the counter substrate and the liquid crystal layer, (c) a second alignment layer between the active matrix substrate and the liquid crystal layer, (d) a first alignment sustaining layer between the liquid crystal layer and the first alignment layer by polymerization of a monomer, which polymerization is carried out in such a manner that radical polymerization is initiated in the first alignment layer, and (e) a second alignment sustaining layer between the liquid crystal layer and the second alignment layer by polymerization of a monomer, which polymerization is carried out in such a manner that radical polymerization is initiated in the second alignment layer.

Moreover, the step of forming the first and second alignment sustaining layers can include the steps of (i) preparing (a) the first and second alignment layers each containing a radical polymerization initiator functional group, (b) a monomer which is a material of the first and second alignment sustaining layers, and (c) a liquid crystal material, causing the monomer to be dissolved in the liquid crystal material, and (iii) causing the monomer in the liquid crystal material to be polymerized in such a manner that radical polymerization is initiated in the first and second alignment layers.

EXAMPLES

Example 1

(1) Example of Production of Alignment Layer Material
1. Synthesis of Material Monomer (A)

The following description deals with an example of synthesis of a diamine monomer (material monomer (A)) having a side chain which contains a photo polymerization initiator (a polymerization initiator functional group) having binaphthalene. Note that, in the following reaction formula, "M. W." indicates a molecular weight of a corresponding compound.

(Process A)

First, a thionyl chloride was dropped into 20 mL of a benzene solution containing 0.96 g (5 mmol) of a 4-(diethylamino) benzoic acid (Compound (2) in the following reaction formula). The resultant was subjected to reaction at room temperature under a nitrogen atmosphere. As a result, a 4-(diethylamino) benzoic acid chloride (Compound (3) in the following reaction formula, 4.65 mmol, a 93% yield) was synthesized.

Next, 5 mL of a benzene solution containing 0.53 g (2.5 mmol) of the 4-(diethylamino) benzoic acid chloride thus obtained was dropped, at room temperature under the nitrogen atmosphere, into 20 mL of a benzene solution containing 0.42 g (2.5 mmol) of an ethyl 4-hydroxybenzoate (Compound (1) in the following reaction formula) and 0.5 g (5 mmol) of triethylamine. After that, the resultant was subjected to reaction for 2 hours at room temperature. After the reaction was finished, an impurity(s) was extracted with the use of water. Then, the resultant was purified by column chromatography (developing solvent: toluene/ethyl acetate (4/1)). As a result, 0.733 g of a target compound (Compound (4) in the reaction formula) was obtained (an 86% yield).

[Chemical Formula 4]

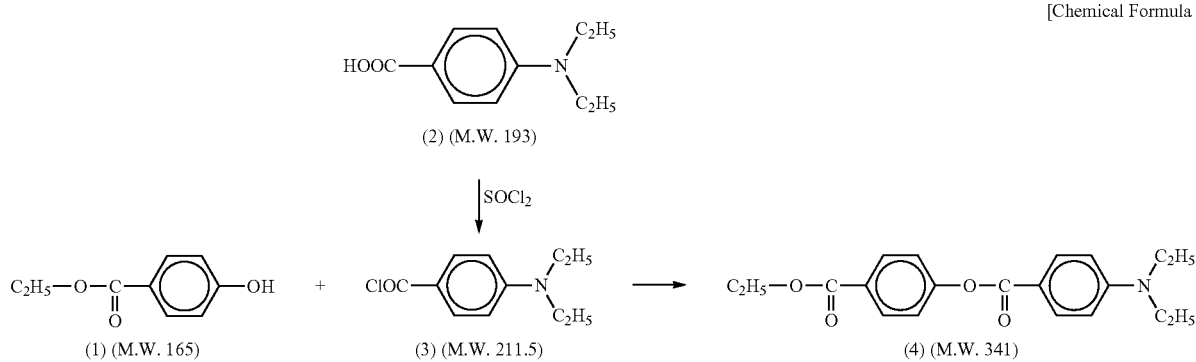

(Process B)

Next, into 20 mL of a THF (tetrahydrofuran)/methanol mixture solution containing 0.7 g (2 mmol) of Compound (4), an aqueous sodium hydroxide and a hydrochloric acid were dropped in this order, and the resultant was stirred for 1 hour. A carboxylic compound (Compound (5) in the reaction formula) was thus synthesized (0.6 g, 1.9 mmol).

[Chemical Formula 5]

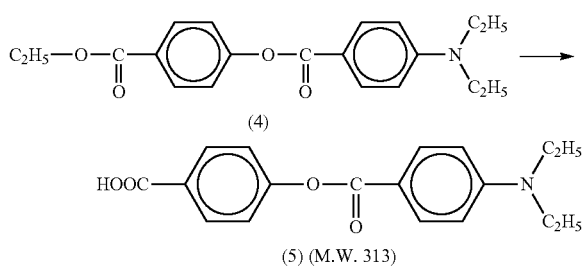

Then, the aforementioned Processes A and B were repeated a plurality of times (n times) so that Compound (6) represented by the following reaction formula was synthesized. More specifically, the carboxylic compound (Compound (5)) and the ethyl 4-hydroxybenzoate (Compound (1)) were subjected to condensation reaction in accordance with the aforementioned Processes A and B so that the above Compound (6) (n=2) was synthesized. The compound thus obtained was further subjected to condensation reaction with the ethyl 4-hydroxybenzoate so that Compound (6) (n=3) was synthesized.

[Chemical Formula 6]

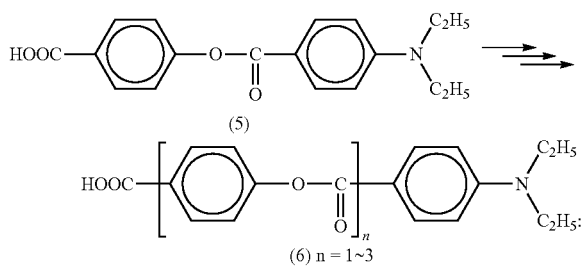

Further, separately, 3 g of a nitrophenylacetic acid (Compound (7) in the following reaction formula) was dissolved in 20 mL of THF. Into the resultant, 7 mL of a 1.9 M toluene solution of a dimethylborane sulfide was dropped. The resultant was left at room temperature overnight. Then, 10 mL of a 50% by weight methanol solution was added to the resultant so as to stop the reaction of the resultant. After that, a reaction product was extracted with the use of 10 mL of chloroform. A chloroform layer was thus extracted. The chloroform layer was washed with 5% by weight sodium bicarbonate water, and then further washed with water. This process was repeated until the reaction product was not extracted to the chloroform layer any more. The reaction product was thus concentrated.

Then, a liquid obtained by the above process was dissolved in 20 mL of chloroform, and was purified by alumina column chromatography. The liquid purified by the alumina column chromatography was concentrated, and, to the resultant thus concentrated, a toluene/n-heptane solution (ratio in volume: 6/4) was added. Then, the resultant was subjected to thermal extraction at 70° C. so that a component was separated and obtained from the resultant. An upper layer component of the component thus obtained was subjected to decantation, and then was cooled. As a result, a 2,4-dinitrophenylethanol (Compound (8)) was obtained (1.2 g, a 42.7% yield).

Next, 0.4 g of Compound (8) thus obtained was dissolved in 8 mL of SOLMIX AP-I (a product manufactured by Japan Alcohol Trading CO., LTD). To the resultant, 0.06 g of Raney nickel was added, and the resultant was put in the autoclave. Hydrogen displacement was carried out in a reaction system of the resultant, and the resultant was left at room temperature overnight with a pressure of 0.4 Mpa. By HPLC (high performance liquid chromatography), it was confirmed that the reaction of the resultant was stopped. Then, a reaction liquid was filtered through Celite (a product manufactured by Celite Corporation). Then, the liquid thus filtered was concentrated until a distillate was not found any more. A crude liquid thus obtained was subjected to reduced-pressure distillation, so that 0.69 g of a 2,4-diaminophenylethanol (Compound (9)) was obtained (an 80% yield).

Then, 0.6 g of Compound (9) described above was dissolved in 5 mL of acetone, and into the resultant, a t-butoxycarbonyl anhydride (1.8 g/5 mL of THF) was dropped. After the dropping, the resultant was heated to a reflux temperature, and was left overnight. After the reaction was finished, a reaction solution was concentrated and dried. A Boc material (Compound (10) in the following reaction formula) in which an amino group of Compound (9) described above was protected with a Boc was obtained (0.13 g, a 94% yield).

[Chemical Formula 7]

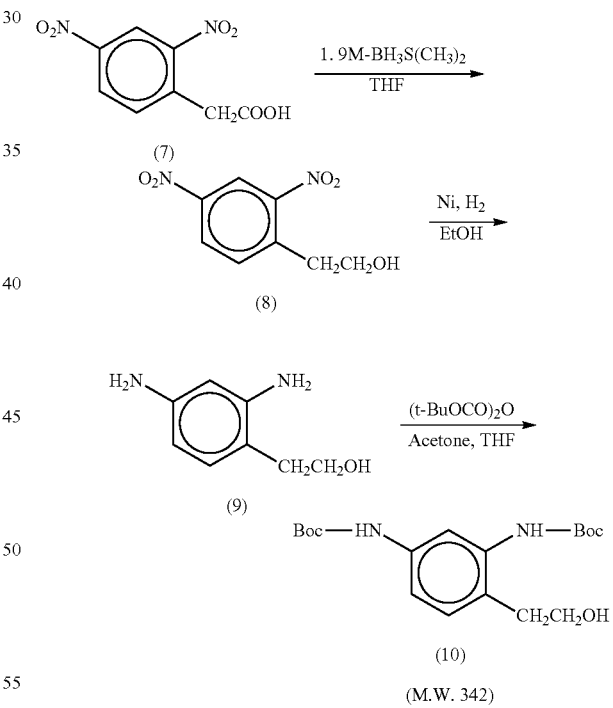

Next, Compound (10) and Compound (6) described above were subjected to condensation reaction, so that Compound (11) represented by the following reaction formula was synthesized. Then, in order to carry out deprotection of the Boc material, Compound (11) was dissolved in a methylene chloride. To the resultant, tin(II) trifluoromethanesulphonate (Sn(OTf)$_2$) was added serially at a temperature of 0° C. Next, the resultant was subjected to reaction at room temperature.

Then, a 5% by weight NaHCO₃ aqueous solution was added to the resultant so as to neutralize the resultant. After that, the resultant was washed with water until it became neutral. An organic layer of the resultant was dried with anhydrous magnesium sulfate, and separated through filtering by use of Celite. A liquid thus filtered was concentrated, so that a target material monomer (A) (Compound (12) in the following reaction formula) was obtained.

3. Production of Material of Alignment Layer

Into a γ-butyrolactone, 0.09 mol of a diamine compound (16) containing a photoreactive functional group, 0.005 mol of the aforementioned Compound (12) (material monomer (A)), and 0.005 mol of the aforementioned Compound (13) (material monomer (B)) were dissolved, so that a monomer solution for a material of an alignment layer was prepared. Next, into the monomer solution thus obtained, 0.10 mol of an acid anhydride (15) shown below was added. The resultant

[Chemical Formula 8]

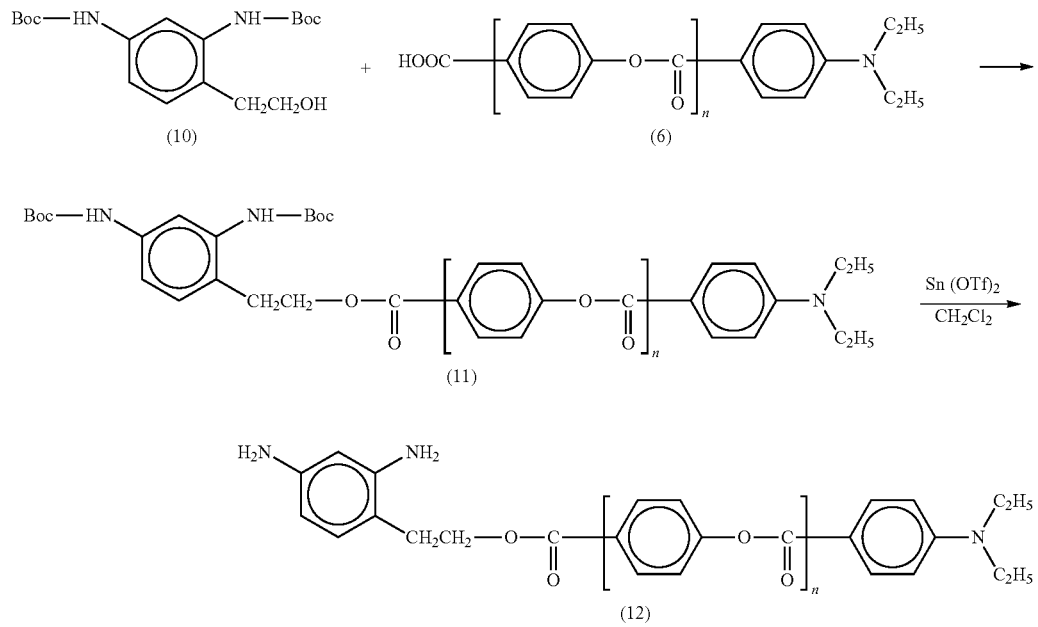

2. Synthesis of Material Monomer (B)

The other diamine monomer (material monomer (B): Compound (13) in the following reaction formula) having a side chain which contains a photo polymerization initiator (polymerization initiator functional group) can be obtained in the same manner as the synthesis method of the material monomer (A) described above, except that, in place of Compound (2) described above, Compound (14) described below is used as an initial material of the synthesis, for example.

was subjected to reaction at a temperature of 60° C. for 12 hours. As a result, a polyamic acid (20) having a random structure, represented by the following chemical formula, was obtained. Note that a methyl group positioned at a terminal of the following diamine compound (16) can be replaced with various fluoromethyl groups (such as —CF₃, —CHF₂, and —CH₂F). With such a fluoromethyl group, it is possible to obtain an alignment layer whose performance is identical with the alignment layer having the diamine compound (16) having the methyl group.

[Chemical Formula 9]

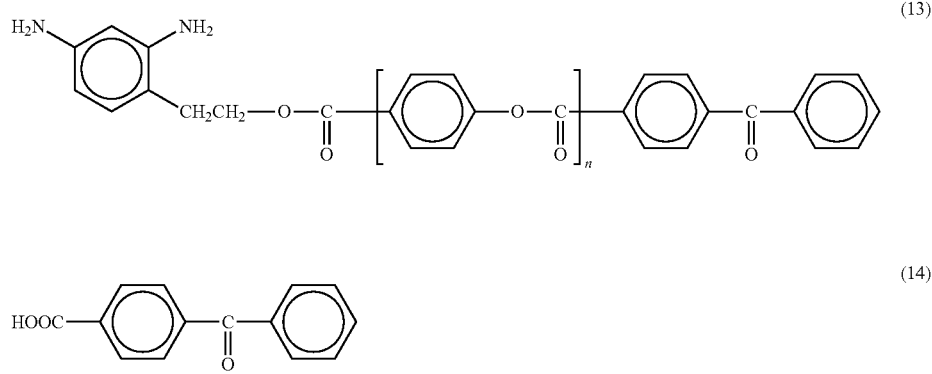

[Chemical Formula 10]
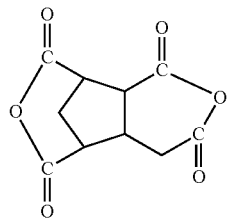
(15)
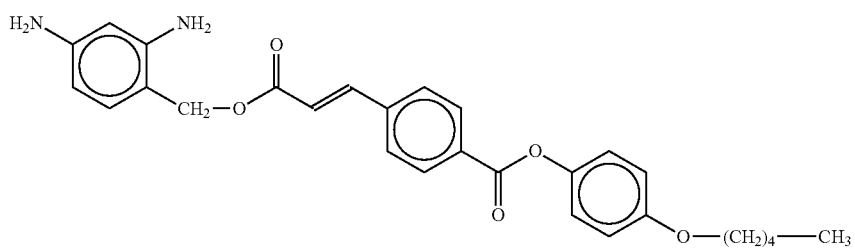
(16)
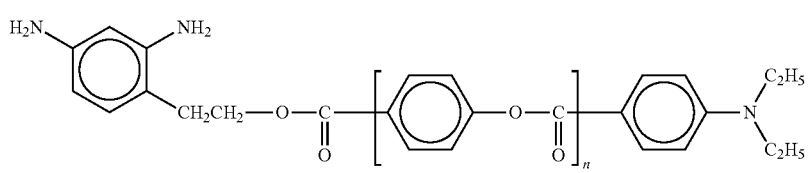
(12)
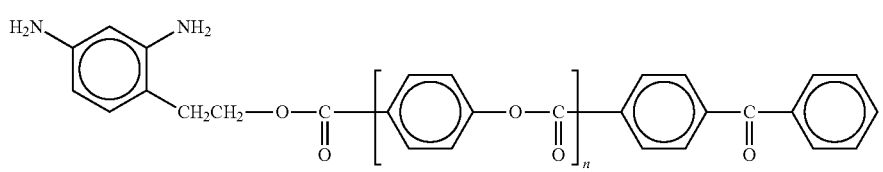
(13)
[Chemical Formula 11]
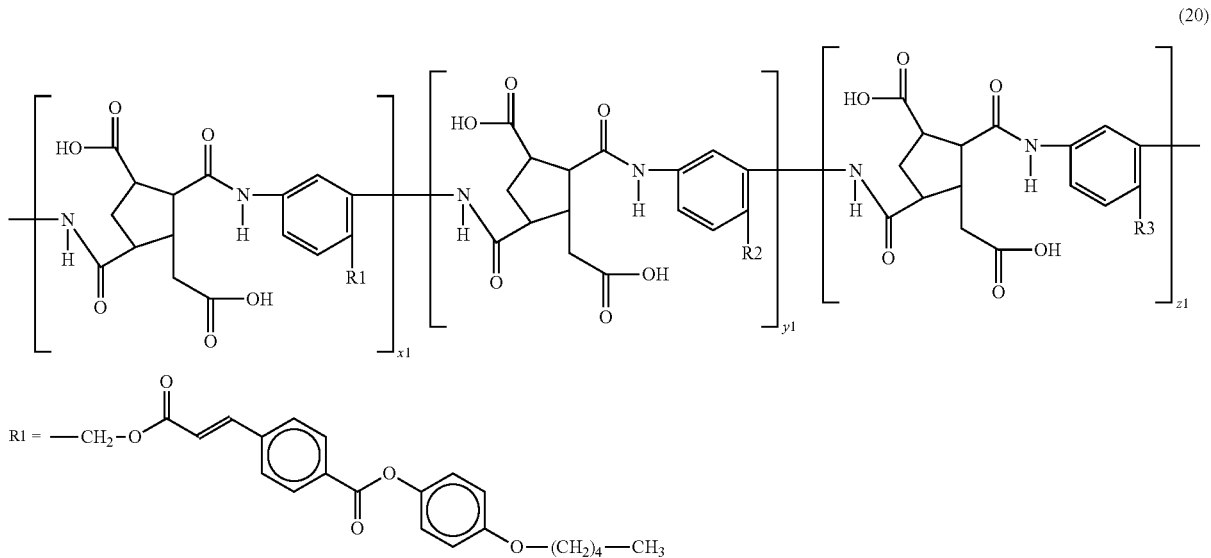
(20)

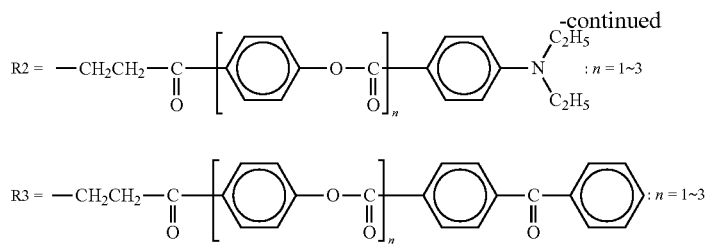

In the polyamic acid (20) containing a photoreactive functional group, a contained amount of the diamine compound (12) having a polymerization initiator function was 10 mol %, and a contained amount of the diamine compound (13) having a polymerization initiator function was 10 mol %.

Further, by appropriately adjusting a molar ratio of the compound (16) and each of the compounds (12) and (13), which compounds (16), (12), and (13) were used in the reaction, it was possible to obtain (i) a polyamic acid (20) containing a photoreactive functional group, which contains 0 mol % of each of the compounds (12) and (13), (ii) a polyamic acid (20) containing a photoreactive functional group, which contains 5 mol % of each of the compounds (12) and (13), and (iii) a polyamic acid (20) containing a photoreactive functional group, which contains 15 mol % of each of the compounds (12) and (13).

(2) Example of Production of Liquid Crystal Cell

A counter electrode 12 was formed on a surface of a glass substrate 11, and then, on the counter electrode, a first vertical alignment layer made from the polyamic acid (20) containing the photoreactive functional group, obtained as described above, was formed. Further, a pixel electrode 22 is formed on a surface of a glass substrate 21, and then, on the pixel electrode 22, a second vertical alignment layer made from the polyamic acid (20) containing the photoreactive functional group, obtained as described above, was formed (see FIG. 1). Next, the glass substrate 11 and the glass substrate 21 are irradiated with linearly polarized light in an oblique direction, so as to be subjected to a photo-alignment process.

Then, a sealing material was applied to a periphery section of the glass substrate 21, and then beads were dispersed on the surface of the glass substrate 11, which surface faced the glass substrate 21, and on which surface the first alignment layer had been formed. After that, the glass substrates 21 and 11 were attached to each other, and liquid crystal having negative dielectric anisotropy was provided between the glass substrates 21 and 11. In addition to liquid crystal molecules, the following bifunctional monomer (17) which was a material of first and second alignment sustaining layers was mixed in and dissolved in the liquid crystal. After the liquid crystal was provided, the substrates 11 and 21 were heated at 130° C. and then rapidly cooled. Then, the liquid crystal cell was irradiated with ultraviolet radiation having a wavelength of 365 nm for 2 hours so that the bifunctional monomer (17) was subjected to the polymerization reaction. Note that no voltage was applied to the liquid crystal cell in the polymerization reaction.

[Chemical Formula 12]

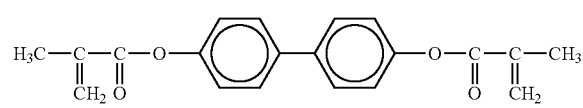

(17)

Note that the aforementioned bifunctional monomer (17) is represented by the general formula (1) which is described at the beginning of [Description of Embodiments] of the present specification, wherein: both $P^1$ and $P^2$ represent a methacrylate group; $S^1$ represents direct binding between $P^1$ and $A^1$; both $A^1$ and $A^2$ represent a 1,4-phenylene group; $Z^1$ represents direct binding between $A^1$ and $A^2$; $S^2$ represents direct binding between $P^2$ and $A^2$; and n is 1.

In each of the first and second alignment layers, a contained amount m of each of the diamine compounds (12) and (13), having the polymerization initiator function, was adjusted to 0 mol %, 5 mol %, 10 mol %, and 15 mol %, as described above. Further, here, a concentration of the bifunctional monomer (17) in the liquid crystal was set to be 0.3% by weight. The following Table 1 shows results of measurement, which will be specifically described later.

Furthermore, in another measurement, in each of the first and second alignment layers, the contained amount m of each of the diamine compounds (12) and (13), having the polymerization initiator function, was set to be 10 mol %, while the concentration of the bifunctional monomer (17) in the liquid crystal was adjusted to be 0% by weight, 0.15% by weight, 0.3% by weight, and 0.6% by weight. The following Table 2 shows results of measurement, which will be specifically described later.

Moreover, as a comparative example, a liquid crystal cell was also prepared with the use of a conventional material in a conventional manner. Specifically, the contained amount m of each of the diamine compounds (12) and (13), having the polymerization initiator function, was set to be 0. Further, the concentration of the bifunctional monomer (17) added to the liquid crystal was set to be 0.3% by weight. The polymerization condition was such that the substrates were irradiated, for 2 hours, with light with the use of a black light having a peak wavelength of 360 nm. The following Table 3 shows results of measurement, which will be specifically described later.

Each of the liquid crystal cells produced as described above was sandwiched between polarizers, and was placed on a backlight. Under the circumstances, a voltage of 10 V was applied to each of the liquid crystal cells for 100 hours at 30 Hz. After the voltage was applied to each of the liquid crystal cells on the backlight, a VHR (a voltage holding ratio), a residual DC (a residual direct current: rDC), and an amount of a change in tilt angle (Δ tilt) were measured. The VHR was measured with a voltage of 1 V and at 70° C. Further, the residual DC was measured with a DC offset voltage of 2 V by a flicker elimination method.

TABLE 1

| Contained Amount of Initiator (mol %) | m = 0 (Comparative Example) | m = 5 (Example) | m = 10 (Example) | m = 15 (Example) |
|---|---|---|---|---|
| VHR (%) | 95.1 | 99.1 | 99.2 | 99.2 |
| rDC (mV) | 450 | 30 | 20 | 20 |

TABLE 1-continued

| Contained Amount of Initiator (mol %) | m = 0 (Comparative Example) | m = 5 (Example) | m = 10 (Example) | m = 15 (Example) |
|---|---|---|---|---|
| Δ tilt (°) | 0.18 | 0.03 | 0.03 | 0.03 |
| Residual Monomer Ratio (%) | 50 | 0.1 or less | 0.1 or less | 0.1 or less |

As shown in Table 1, by causing the side chain of the alignment layer to have the functional group having the polymerization initiator function, the VHR, the rDC, and Δ tilt were significantly improved. On the other hand, in the case where the side chain of the alignment layer contained no initiator (see "m=0 (Comparative Example)" in Table 1), the polymerization of the bifunctional monomer (17) was not developed by irradiation of the ultraviolet radiation having a wavelength of 365 nm, and there was a large amount of the residual monomer. As a result, the VHR, the rDC, and the Δ tilt became worse as compared with the present invention, and image sticking was generated.

TABLE 2

| Monomer Concentration (% by weight) | 0 (Comparative Example) | 0.15 (Example) | 0.3 (Example) | 0.6 (Example) |
|---|---|---|---|---|
| VHR (%) | 94.5 | 98.5 | 99.2 | 99.2 |
| rDC (mV) | 500 | 40 | 20 | 20 |
| Δ tilt (°) | 0.15 | 0.07 | 0.03 | 0.03 |
| Residual Monomer Ratio (%) | None | 0.1 or less | 0.1 or less | 0.1 or less |

As shown in Table 2, in the case where the photo-alignment layer having the side chain which had the polymerization initiator function was used, the VHR, the rDC, and the Δ tilt were improved as the bifunctional monomer (17) was increased in concentration. It seems that the VHR, the rDC, and the Δ tilt were improved because the higher the concentration of the bifunctional monomer became, the less an image sticking property of the photo-alignment layer serving as a base layer had an influence on the liquid crystal, which influence caused the liquid crystal to be unstable. On the other hand, in the case where the bifunctional monomer (17) was not used (see "Monomer Concentration" "0 (Comparative Example)" in Table 2), the VHR, the rDC, and the Δ tilt became worse as compared with the present invention, and image sticking was generated.

TABLE 3

|  | Comparative Liquid Crystal Cell (Comparative Example) |
|---|---|
| VHR (%) | 97.9 |
| rDC (mV) | 340 |
| Δ tilt (°) | 0.09 |
| Residual Monomer Ratio (%) | 0.1 or less |

As shown in Table 3, no polymerization initiator was used in this comparative example. Nevertheless, it seems that the polymerization of the bifunctional monomer (17) was developed due to an influence of short-wavelength ultraviolet radiation emitted from the black light, and there was substantially no residual monomer. However, as compared with Examples shown in Table 1 and Table 2, the VHR, the rDC, and the Δ tilt of the comparative example became worse, and image sticking was generated. It seems that the VHR and the rDC of the comparative example became worse as compared with the case where the alignment layer having the side chain which had the polymerization initiator function was used, because (i) a material constituting the liquid crystal cell was decomposed due to irradiation of a short-wavelength component, and (ii) this caused an impurity(s) to be mixed in the liquid crystal layer. Further, it seems that the Δ tilt of the comparative example became worse because (i) the alignment layer and the alignment sustaining layer were not covalently bound to each other, and, as a result, (ii) an oligomer or a polymer, derived from the bifunctional monomer (17) contained in the alignment sustaining layer, was dissolved in the liquid crystal layer, and this caused phase separation again due to polymerization.

As described above, in a test in which (i) each of the liquid crystal cells was placed on the backlight and (ii) a voltage was supplied to each of the liquid crystal cells, the liquid crystal cell employing a combination of the following (I) and (II) was improved in VHR, rDC, and Δ tilt than the comparative example, and no image sticking was generated with such a liquid crystal cell (see the results shown in Tables 1 through 3): (I) the photo-alignment layer in which the alignment layer had the side chain which had a polymerization initiator function, and (II) the alignment sustaining layer.

It seems that this result is mainly based on the following reasons.

(1) The alignment layer and the alignment sustaining layer are covalently bound to each other, so that no polymer was separated out of the alignment sustaining layer substantially. This reduces the generation of image sticking due to a change in pretilt angle.

(2) The alignment layer having the side chain which has a polymerization initiator function is used so that the polymerization can be carried out with ultraviolet radiation having relatively low energy (that is, ultraviolet radiation having a relatively long wavelength). This substantially eliminates deterioration of the material constituting the liquid crystal cell, so that generation of image sticking due to electricity is reduced.

3. Further, since the alignment layer and the polymerization initiator are chemically bound to each other, there is no polymerization initiator in the liquid crystal layer. Accordingly, no image sticking is generated electrically due to the polymerization initiator.

Example 2

(1) Example of Production of Alignment Layer Material

Into γ-butyrolactone, 0.09 mol of a diamine compound (18) having a vertical alignment group, shown in the following reaction formula, 0.005 mol of a diamine compound (12) (monomer material (A) in Example 1) having an initiator function, and 0.005 mol of a diamine compound (13) (monomer material (B) in Example 1) having the initiator function were dissolved, so that a monomer solution for a material of an alignment layer was prepared. Then, into the monomer solution thus obtained, 0.10 mol of an acid anhydride (15) represented by the following reaction formula was added. The resultant was subjected to reaction for 12 hours at 60° C. A polyamic acid (21) having a random structure, represented by the following chemical formula, was thus obtained.

[Chemical Formula 13]
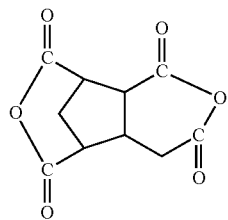
(15)
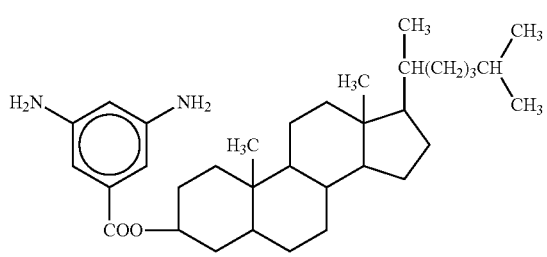
(18)
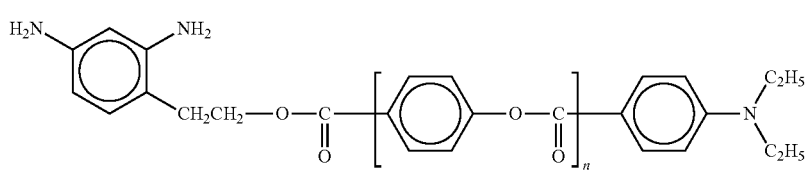
(12)
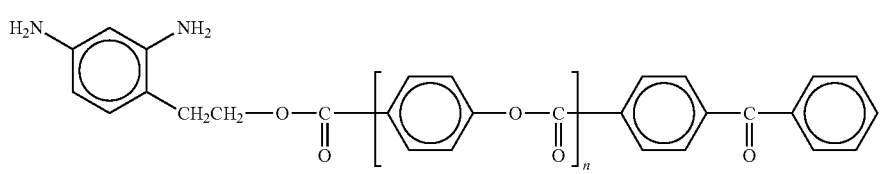
(13)
[Chemical Formula 14]
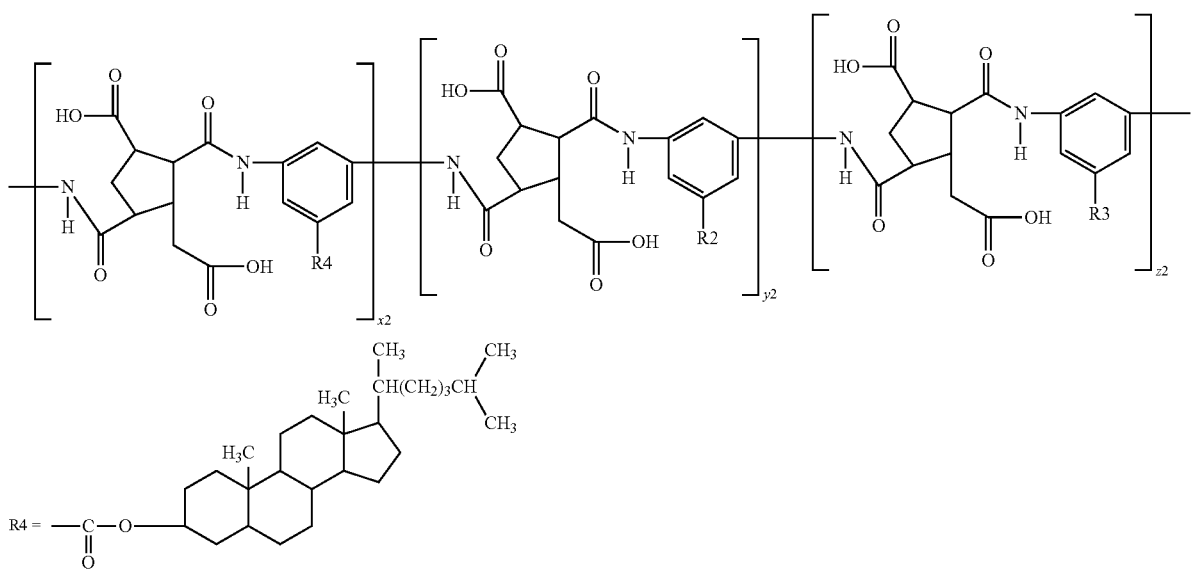
(21)

-continued

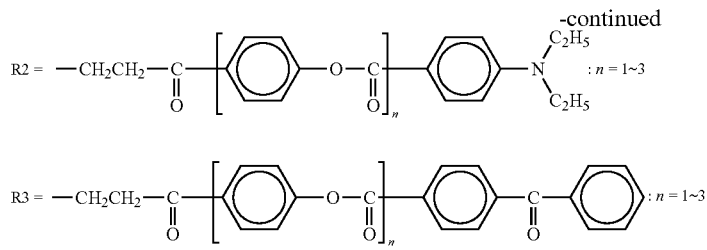

In the polyamic acid (21) having the vertical alignment group, a contained amount of each of the diamine compounds (12) and (13) each having the initiator function was 10 mol %.

Further, by appropriately adjusting a molar ratio of the diamine compound (18) having the vertical alignment group, each of the diamine compounds (12) and (13), each having the initiator function (which compounds (18), (12), and (13) were used in the reaction), it was possible to obtain (i) a polyamic acid (21) having 0 mol % of each of the compounds (12) and (13), (ii) a polyamic acid (21) having 5 mol % of each of the compounds (12) and (13), and (iii) a polyamic acid (21) having 15 mol % of each of the compounds (12) and (13).

(2) Example of Production of Liquid Crystal Cell

A counter electrode 12 was formed on a surface of a glass substrate 11, and then, on the counter electrode 12, a first alignment layer made from the polyamic acid (21) having the vertical alignment function, obtained as described above, was formed. Further, a pixel electrode 22 was formed on a surface of a glass substrate 21, and then, on the pixel electrode 22, a second alignment layer made from the polyamic acid (21) was formed (see FIG. 1). Note that, in the present example, an electrode 42 having a comb-like shape (see FIG. 2) was used as the pixel electrode 22.

Next, a sealing material was applied to a periphery section of the glass substrate 21, and beads were dispersed on the surface of the glass substrate 11, which surface faced the glass substrate 21, and on which surface the first alignment layer had been formed. After that, glass substrates 21 and 11 were attached to each other, and liquid crystal having negative dielectric anisotropy was provided between the glass substrates 21 and 11. In addition to liquid crystal molecules, the following bifunctional monomer (17) was mixed in and dissolved in the liquid crystal. After the liquid crystal was provided, the substrates were heated at 130° C. and then rapidly cooled. Then, a liquid crystal cell was irradiated with ultraviolet radiation having a wavelength of 365 nm for 1 hour, while a voltage was applied to a liquid crystal cell. Polymerization reaction of the bifunctional monomer (17) was thus carried out. After that, the liquid crystal cell was further irradiated with ultraviolet radiation having a wavelength of 365 nm for 3 hours, while no voltage was applied to the liquid crystal cell.

In each of the first and second alignment layers, a contained amount m of each of the diamine compounds (12) and (13) each having the initiator function was adjusted to be 0 mol %, 5 mol %, 10 mol %, and 15 mol % as described above. Further, here, a concentration of the bifunctional monomer (17) in the liquid crystal was set to be 0.3% by weight. The following Table 4 shows results of measurement, which will be described later.

Furthermore, in another measurement, in each of the first and second alignment layers, the contained amount m of each of the diamine compounds (12) and (13), each having the initiator function, was set to be 10 mol %, while the concentration of the bifunctional monomer (17) in the liquid crystal was adjusted to be 0% by weight, 0.15% by weight, 0.3% by weight, and 0.6% by weight. The following Table 5 shows results of measurement, which will be described later.

Moreover, as a comparative example, a liquid crystal cell was prepared with the use of a conventional material in a conventional manner. Specifically, the contained amount m of each of the diamine compounds (12) and (13), each having the initiator function, was set to be 0. Further, the concentration of the bifunctional monomer (17) added to the liquid crystal was set to be 0.3% by weight. Under the circumstances, the liquid crystal cell was irradiated with light with the use of a black light having a peak wavelength of 360 nm while a voltage was applied to the liquid crystal cell. Then, the liquid crystal cell was further irradiated with light with the use of the black light for 3 hours while no voltage was applied to the liquid crystal cell. The following Table 6 shows results of measurement, which will be described later.

Each of the liquid crystal cells thus produced was sandwiched between polarizers and was placed on a backlight. Under the circumstances, a voltage of 10 V was applied to each of the liquid crystal cells for 100 hours at 30 Hz. After the voltage was applied to each of the liquid crystal cells, each being provided on the backlight, a VHR (voltage holding ratio), an rDC (residual direct voltage), and an amount of a change in tilt angle (Δ tilt) were measured. The VHR was measured with a voltage of 1 V and at 70° C. Further, the residual DC was measured with a DC offset voltage of 2 V by a flicker elimination method.

TABLE 4

| Contained Amount of Initiator (mol %) | m = 0 (Comparative Example) | m = 5 (Example) | m = 10 (Example) | m = 15 (Example) |
|---|---|---|---|---|
| VHR (%) | 97.6 | 99.1 | 99.5 | 99.5 |
| rDC (mV) | 310 | −30 | −30 | −40 |
| Δ tilt (°) | 0.34 | 0.03 | 0.03 | 0.03 |
| Residual Monomer Ratio (%) | 70 | 0.1 or less | 0.1 or less | 0.1 or less |

As shown in Table 4, by causing the side chain of the alignment layer to have a functional group having a polymerization initiator function, the VHR, the rDC, and the Δ tilt were significantly improved. On the other hand, in the case where the side chain of the alignment layer contained no initiator (see "m=0 (Comparative Example)" in Table 4), polymerization of the bifunctional monomer (17) was not developed by irradiation of ultraviolet radiation having a wavelength of 365 nm, and there was a large amount of the residual monomer. As a result, the VHR, the rDC, and the Δ tilt became worse as compared with the present invention, and image sticking was generated.

TABLE 5

| Monomer Concentration (% by weight) | 0 (Comparative Example) | 0.15 (Example) | 0.3 (Example) | 0.6 (Example) |
|---|---|---|---|---|
| VHR (%) | 98.5 | 99.4 | 99.5 | 99.5 |
| rDC (mV) | No Alignment | −20 | −30 | −30 |
| Δ tilt (°) | No Alignment | 0.18 | 0.03 | 0.03 |
| Residual Monomer Ratio (%) | None | 0.1 or less | 0.1 or less | 0.1 or less |

As shown in Table 5, in the case where the vertical alignment layer having the side chain which had the polymerization initiator function was used, the VHR, the rDC, and the Δ tilt were improved as the concentration of the bifunctional monomer (17) was increased. It seems that the VHR, the rDC, and the Δ tilt were improved because the higher the concentration of the bifunctional monomer (17) became, the more sufficiently the vertical alignment layer serving as a base layer was covered with the alignment sustaining layer. On the other hand, in the case where no bifunctional monomer (17) was used (see "Monomer Concentration"="0 (Comparative Example)" in Table 5), the VHR, the rDC, and the Δ tilt became worse as compared with the present invention, and image sticking was generated. Note that the Δ tilt became larger in a case where the concentration of the bifunctional monomer (17) was 0.15% by weight, as compared with a case where the concentration was 0.3% by weight or more. It seems that the Δ tilt became larger because the higher the concentration of the bifunctional monomer (17) became, the more sufficiently the alignment layer serving as a base layer was covered with the alignment sustaining layer.

TABLE 6

| | Comparative Liquid Crystal Cell (Comparative Example) |
|---|---|
| VHR (%) | 98.5 |
| rDC (mV) | 150 |
| Δ tilt (°) | 0.23 |
| Residual Monomer Ratio (%) | 0.3 |

As shown in Table 6, no polymerization initiator was used in this comparative example. Nevertheless, the polymerization of the bifunctional monomer (17) was developed due to an influence of short-wavelength ultraviolet radiation emitted from the black light, and an amount of the residual monomer was reduced. However, as compared with the examples shown in Tables 4 and 5, the VHR, the rDC, and the Δ tilt became worse, and image sticking was generated. Particularly, the Δ tilt became worse significantly. It seems that, the Δ tilt became worse because, in the comparative example, (i) the alignment layer and the alignment sustaining layer were not covalently bound to each other, and as a result, (ii) an oligomer or a polymer, derived from the bifunctional monomer (17) contained in the alignment sustaining layer, was dissolved in the liquid crystal layer, and (iii) this caused phase separation again due to polymerization. Further, it seems that the VHR and the rDC became worse as compared with the case where the alignment layer having the side chain which had the polymerization initiator function was used, because a material constituting the liquid crystal cell was decomposed by irradiation of the short-wavelength component, and this caused an impurity(s) to be mixed in the liquid crystal layer.

As described above, in a test in which (i) each of the liquid crystal cells was placed on the backlight and (ii) a voltage was supplied to each of the liquid crystal cells, the liquid crystal cell employing a combination of the following (I) and (II) was improved in VHR, rDC, and Δ tilt than the comparative example, and no image sticking was generated with such a liquid crystal cell (see the results shown in Tables 4 through 6): (I) the vertical alignment layer in which the alignment layer had the side chain which had a polymerization initiator function, and (II) the alignment sustaining layer. It seems that this result is based on the same reasons as those of Example 1.

Example 3

(1) Example of Production of Alignment Layer Material

In the present example, a material constituting an alignment layer was prepared in the same manner as Example 1.

(2) Example of Production of Liquid Crystal Cell

A counter electrode 12 was formed on a surface of a glass substrate 11, and then, on the counter electrode 12, a first vertical alignment layer made from a polyamic acid (20) having a photoreactive functional group, which is the same as that of Example 1, was formed. Further, a pixel electrode 22 was formed on a surface of a glass substrate 21, and then, on the pixel electrode 22, a second vertical alignment layer made from the polyamic acid (20) having the photoreactive functional group was formed (see FIG. 1). Next, each of the glass substrates 11 and 21 was irradiated with linear polarized light in an oblique direction, so as to be subjected to a photo-alignment process.

Next, a sealing material was applied to a periphery section of the glass substrate 21, and beads were dispersed on the surface of the glass substrate 11, which surface faced the glass substrate 21, and on which surface the first alignment layer had been formed. After that, the glass substrates 21 and 11 were attached to each other, and liquid crystal having negative dielectric anisotropy was provided between the glass substrates 21 and 11. In addition to liquid crystal molecules, the following bifunctional monomer (19) which was a material of an alignment sustaining layer was mixed in and dissolved in the liquid crystal. After the liquid crystal was provided, the substrates were heated at 130° C. and then rapidly cooled. Then, a liquid crystal cell was irradiated with ultraviolet radiation having a wavelength of 365 nm for 2 hours. Polymerization reaction of the bifunctional monomer (19) was thus carried out. Note that the polymerization reaction was carried out, while no voltage was applied to the liquid crystal cell.

[Chemical Formula 15]

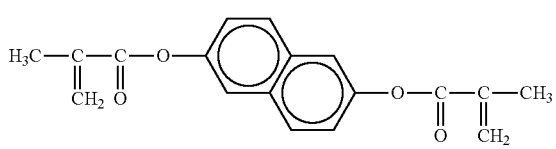

(19)

The bifunctional monomer (19) described above was represented by the general formula (1) shown at the beginning of "Description of Embodiments" of the present specification, wherein: both $P^1$ and $P^2$ represent a methacrylate group; $S^1$ represents direct binding between $P^1$ and $A^1$; $A^1$ represents a naphthalene-2,6-dyil group; $S^2$ represents direct binding between $P^2$ and $A^2$ (here, $A^1$ and $P^2$ are directly bound to each other because n is 0, as described later); and n is 0).

In each of the first and second alignment layers, a contained amount m of each of diamine compounds (12) and (13), each having an initiator function, was set to be 0 mol %, 5 mol %, 10 mol %, and 15 mol %, as described above. Further, here, a concentration of the bifunctional monomer (19) in the liquid crystal was set to be 0.6% by weight. The following Table 7 shows results of measurement, which will be described later.

Further, in another measurement, in each of the first and second alignment layers, the contained amount m of each of the diamine compounds (12) and (13), each having the initiator function, was set to be 10 mol %, while the concentration of the bifunctional monomer (19) in the liquid crystal was adjusted to be 0% by weight, 0.3% by weight, 0.6% by weight, and 1.0% by weight. The following Table 8 shows results of measurement, which will be described later.

Further, as a comparative example, a liquid crystal cell was prepared with the use of a conventional material in a conventional manner. Specifically, the contained amount m of each of the diamine compounds (12) and (13), each having the initiator function, was set to be 0. Further, the concentration of the bifunctional monomer (19) in the liquid crystal was set to be 0.6% by weight. Under the circumstances, the liquid crystal cell was irradiated, for 2 hours, with light with the use of a black light having a peak wavelength of 360 nm. The following Table 9 shows results of measurement, which will be described later.

Each of the liquid crystal cells thus produced was placed on a backlight, and a voltage was applied to each of the liquid crystal cells in the same manner as Example 1. Then, for each of the liquid crystal cells, a VHR, a residual DC, and an amount of a change in tilt angle were measured in accordance with the method described in Example 1.

TABLE 7

| Contained Amount of Initiator (mol %) | m = 0 (Comparative Example) | m = 5 (Example) | m = 10 (Example) | m = 15 (Example) |
|---|---|---|---|---|
| VHR (%) | 95.5 | 99.4 | 99.4 | 99.4 |
| rDC (mV) | 450 | 20 | 20 | 10 |
| Δ tilt (°) | 0.18 | 0.06 | 0.06 | 0.06 |
| Residual Monomer Ratio (%) | 50 | 0.1 or less | 0.1 or less | 0.1 or less |

As shown in Table 7, by causing the side chain of the alignment layer to have the functional group having the polymerization initiator function, the VHR, the rDC, and the Δ tilt were significantly improved. On the other hand, in the case where no initiator was contained in the side chain of the alignment layer (see "m=0 (Comparative Example)" in Table 7), the polymerization of the bifunctional monomer (19) was not developed by irradiation of ultraviolet radiation having a wavelength of 365 nm, and there was a large amount of the residual monomer. As a result, the VHR, the rDC, and the Δ tilt became worse as compared with the present invention, and image sticking was generated.

TABLE 8

| Monomer Concentration (% by weight) | 0 (Comparative Example) | 0.3 (Example) | 0.6 (Example) | 1.0 (Example) |
|---|---|---|---|---|
| VHR (%) | 95.3 | 99.0 | 99.4 | 99.4 |
| rDC (mV) | 480 | 20 | 20 | 10 |
| Δ tilt (°) | 0.15 | 0.09 | 0.06 | 0.05 |
| Residual Monomer Ratio (%) | None | 0.1 or less | 0.1 or less | 0.1 or less |

As shown in Table 8, in the case where the photo-alignment layer having the side chain which had the polymerization initiator function was used, the VHR, the rDC, and the Δ tilt were improved as the concentration of the bifunctional monomer (19) was increased. It seems that the VHR, the rDC, and the Δ tilt were improved because the higher the concentration of the bifunctional monomer (19) became, the less an image sticking property of the photo-alignment layer serving as a base layer had an influence on the liquid crystal, which influence caused the liquid crystal to be unstable. On the other hand, in the case where no bifunctional monomer (19) was used (see "Monomer Concentration"="0 (Comparative Example)" in Table 8), the VHR, the rDC, and the Δ tilt became worse as compared with the present invention, and image sticking was generated.

TABLE 9

| | Comparative Liquid Crystal Cell (Comparative Example) |
|---|---|
| VHR (%) | 98.0 |
| rDC (mV) | 60 |
| Δ tilt (°) | 0.14 |
| Residual Monomer Ratio (%) | 0.1 or less |

As shown in Table 9, no polymerization initiator was used in this comparative example. Nevertheless, it seems that the polymerization of the bifunctional monomer (19) was developed due to an influence of short-wavelength ultraviolet radiation emitted from the black light, and there was substantially no residual monomer. However, as compared with the examples shown in Tables 7 and 8, the VHR, the rDC, and the Δ tilt became worse, and image sticking was generated. It seems that the VHR and the rDC became worse as compared with the case where the alignment layer having the side chain which had the polymerization initiator function was used, because a material constituting the liquid crystal cell was decomposed due to irradiation of a short-wavelength component and this caused impurities to be mixed in the liquid crystal layer. Further, it seems that the Δ tilt became worse because (i) the alignment layer and the alignment sustaining layer were not covalently bound to each other, and, as a result, (ii) an oligomer or a polymer, derived from the bifunctional monomer (19), was separated out into the liquid crystal layer, and (iii) this caused phase separation again due to polymerization.

As described above, in a test in which (i) each of the liquid crystal cells was placed on the backlight and (ii) a voltage was supplied to each of the liquid crystal cells, the liquid crystal cell employing a combination of the following (I) and (II) was improved in VHR, rDC, and Δ tilt than the comparative example, and no image sticking was generated with such a liquid crystal cell (see the results shown in Tables 7 through 9): (I) the photo-alignment layer in which the alignment layer had the side chain which had a polymerization initiator function, and (II) the alignment sustaining layer.

Example 4

(1) Example of Production of Alignment Layer Material

According to the present example, a material constituting an alignment layer was prepared in the same manner as Example 2.

(2) Example of Production of Liquid Crystal Cell

A counter electrode 12 was formed on a surface of a glass substrate 11, and then, on the counter electrode 12, a first alignment layer made from a polyamic acid (21) having the same vertical alignment property as that of Example 2 was formed. Further, a pixel electrode 22 was formed on a surface of a glass substrate 21, and then, on the pixel electrode 22, a second alignment layer made from the polyamic acid (21) was formed (see FIG. 1). According to the present example, an electrode having a comb-like shape, illustrated in FIG. 2, was used as the pixel electrode 22.

Next, a sealing material was applied to a periphery section of the glass substrate 21, and beads were dispersed on the surface of the glass substrate 11, which surface faced the glass substrate 21, and on which surface the first alignment layer had been formed. After that, the glass substrates 21 and 11 were attached to each other, and liquid crystal having negative dielectric anisotropy was provided between the glass substrates 21 and 11. In addition to liquid crystal molecules, a bifunctional monomer (19) described above, which was a material of an alignment sustaining layer, was mixed in and dissolved in the liquid crystal. After the liquid crystal was provided, the substrates were heated at 130° C., and then rapidly cooled. Then, a liquid crystal cell was irradiated with ultraviolet radiation having a wavelength of 365 nm for 1 hour while a voltage was applied to the liquid crystal cell. Polymerization reaction of the bifunctional monomer (19) was thus carried out. After that, the liquid crystal cell was further irradiated with the ultraviolet radiation having a wavelength of 365 nm for 3 hours while no voltage was applied to the liquid crystal cell.

In each of the first and second alignment layers, a contained amount m of each of diamine compounds (12) and (13), each having an initiator function, was set to be 0 mol %, 5 mol %, 10 mol %, and 15 mol %, as described above. Further, here, a concentration of the bifunctional monomer (19) in the liquid crystal was set to be 0.6% by weight. The following Table 10 shows results of measurement, which will be described later.

Further, in another measurement, in each of the first and second alignment layers, the contained amount m of each of the diamine compounds (12) and (13), each having the initiator function, was set to be 10 mol %, while the concentration of the bifunctional monomer (19) was adjusted to be 0% by weight, 0.3% by weight, 0.6% by weight, and 1.0% by weight. The following Table 11 shows results of measurement, which will be described later.

Furthermore, as a comparative example, a liquid crystal cell was prepared with the use of a conventional material in a conventional manner. Specifically, the contained amount m of each of the diamine compounds (12) and (13), each having the initiator function, was set to be 0. Furthermore, the concentration of the bifunctional monomer (19) in the liquid crystal was set to be 0.6% by weight. Under the circumstances, the liquid crystal cell was irradiated with light with the use of a black light having a peak wavelength of 360 nm, while a voltage was applied to the liquid crystal cell. Then, the liquid crystal cell was further irradiated with light with the use of the black light for 3 hours while no voltage was applied to the liquid crystal cell. The following Table 12 shows results of measurement, which will be described later.

Each of the liquid crystal cells thus produced was placed on a backlight and a voltage was applied to each of the liquid crystal cells in the same manner as Example 2. Then, for each of the liquid crystal cells, a VHR, a residual DC, and an amount of a change in tilt angle were measured in accordance with the method described in Example 2.

TABLE 10

| Contained Amount of Initiator (mol %) | M = 0 (Comparative Example) | m = 5 (Example) | m = 10 (Example) | m = 15 (Example) |
|---|---|---|---|---|
| VHR (%) | 98.6 | 99.5 | 99.5 | 99.5 |
| rDC (mV) | 210 | −40 | −40 | −50 |
| Δ tilt (°) | 0.38 | 0.13 | 0.09 | 0.08 |
| Residual Monomer Ratio (%) | 70 | 0.1 or less | 0.1 or less | 0.1 or less |

As shown in Table 10, by causing the side chain of the alignment layer to have the functional group having the polymerization initiator function, the VHR, the rDC, and the Δ tilt were significantly improved. On the other hand, in the case where no initiator was contained in the side chain of the alignment layer (see "m=0 (Comparative Example)" in Table 10), polymerization of the bifunctional monomer (19) was not developed, and there was a large amount of the residual monomer. As a result, the VHR, the rDC, and the Δ tilt became worse as compared with the present example, and image sticking was generated.

TABLE 11

| Monomer Concentration (% by weight) | 0 (Comparative Example) | 0.3 (Example) | 0.6 (Example) | 1.0 (Example) |
|---|---|---|---|---|
| VHR (%) | 98.8 | 99.5 | 99.5 | 99.5 |
| rDC (mV) | No Alignment | −30 | −40 | −30 |
| Δ tilt (°) | No Alignment | 0.18 | 0.09 | 0.09 |
| Residual Monomer Ratio (%) | None | 0.1 or less | 0.1 or less | 0.1 or less |

As shown in Table 11, in the case where vertical alignment layer having the side chain which had the polymerization initiator function was used, the VHR, the rDC, and the Δ tilt were improved as the concentration of the bifunctional monomer (19) was increased. It seems that the VHR, the rDC, and the Δ tilt were improved because the higher the concentration of the bifunctional monomer (19) became, the more sufficiently the vertical alignment layer serving as a base layer was covered with the alignment sustaining layer. On the other hand, in the case where no bifunctional monomer (19) was used (see "Monomer Concentration"="0 (Comparative Example)" in Table 11), the VHR, the rDC, and the Δ tilt became worse as compared with the present invention, and image sticking was generated.

TABLE 12

| | Comparative Liquid Crystal Cell (Comparative Example) |
|---|---|
| VHR (%) | 99.2 |
| rDC (mV) | 40 |
| Δ tilt (°) | 0.28 |
| Residual Monomer Ratio (%) | 0.3 |

As shown in Table 12, no polymerization initiator was used in this comparative example. Nevertheless, the polymerization of the bifunctional monomer (19) was developed due to an influence of short-wavelength ultraviolet radiation emitted from the black light, and there was a reduction in the amount of the residual monomer. However, as compared with the examples shown in Tables 10 and 11, the VHR, the rDC, and the Δ tilt became worse, and image sticking was generated. Particularly, the Δ tilt became significantly worse. It seems that the Δ tilt became worse because (i) the alignment layer and the alignment sustaining layer were not covalently bound to each other, and as a result, (ii) an oligomer or a polymer, derived from the bifunctional monomer (19) contained in the alignment sustaining layer, was separated out into the liquid crystal layer, and (iii) this caused phase separation again due to polymerization. Further, it seems that the VHR and the rDC of the comparative example became worse as compared with the case where the alignment layer having the side chain which had the polymerization initiator function was used, because a material constituting the liquid crystal cell was decomposed by irradiation of a short-wavelength component, and this caused impurities to be mixed into the liquid crystal layer.

Example 5

(1) Example of Production of Alignment Layer Material

According to the present example, a polyamic acid (20) having a random structure was obtained in the same manner as Example 1. Further, the following process was carried out so as to imidize the polyamic acid (20) thus obtained. That is, into a γ-butyrolactone solution of the polyamic acid (20) thus obtained, an excess amount of pyridine (0.5 mol) and 0.3 mol of an acetic anhydride were added. Then, the resultant was subjected to reaction for 3 hours at 150° C. A polyimide was thus obtained. The polyimide had a 30,000 weight average molecular weight, and 2.5 molecular weight distribution. Further, an imidized ratio was more than 80%. A polyimide (22) having a photoreactive functional group, represented by the following chemical formula, was thus obtained, which polyimide (22) could be used as an alignment layer. In the polyimide (22) thus obtained, a contained amount of each of diamine compounds (12) and (13), each having an initiator function, was 10 mol %. Note that a methyl group positioned at a terminal of a side chain R1 of the polyimide (22) having the photoreactive functional group can be replaced with various fluoromethyl groups ($-CF_3$, $-CHF_2$, $-CH_2F$). In this case, it is possible to obtain an alignment layer which has performance identical with that of the alignment layer having the methyl group.

(2) Example of Production of Liquid Crystal Cell

According to the present example, a liquid crystal cell was prepared in the same manner as Example 1, except that the polyimide (22) having the photoreactive functional group was used as a material of an alignment layer in place of the polyamic acid (20) having a photoreactive functional group.

In each of the first and second alignment layers, a contained amount m of each of the diamine compounds (12) and (13), each having the initiator function, was adjusted to be 0 mol %, 5 mol %, 10 mol %, and 15 mol %, as described above. Further, here, the concentration of the bifunctional monomer (17) in liquid crystal was set to be 0.3% by weight. The following Table 13 shows results of measurement, which will be described later.

Further, in another measurement, in each of the first and second alignment layers, the contained amount m of each of the diamine compounds (12) and (13), each having the initiator function, was set to be 10 mol %, while the concentration of the bifunctional monomer (17) in the liquid crystal was adjusted to be 0% by weight, 0.15% by weight, 0.3% by weight, and 0.6% by weight. The following Table 14 shows results of measurement, which will be described later.

Further, as a comparative example, a liquid crystal cell was prepared with the use of a conventional material in a conventional manner. Specifically, the contained amount m of each of the diamine compounds (12) and (13), each having the

[Chemical formula 16]

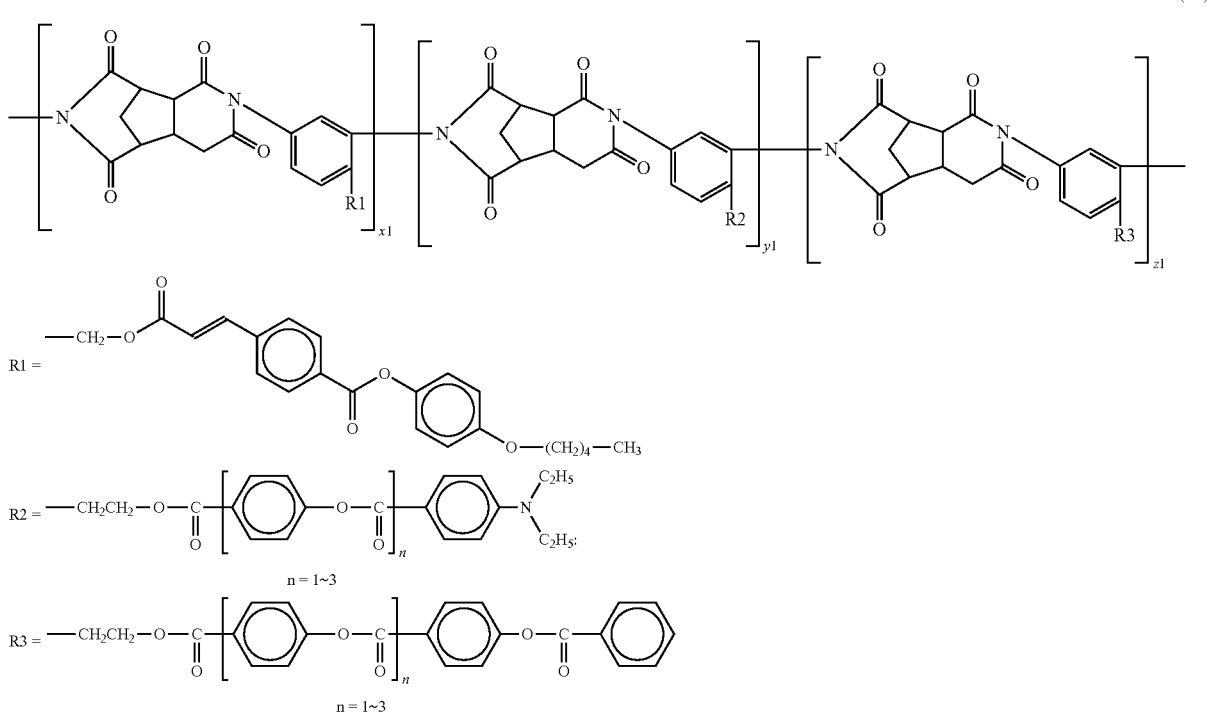

(22)

Further, by appropriately adjusting a molar ratio of a diamine compound (16) having a photoreactive functional group, and each of the diamine compounds (12) and (13), each having the photoreactive functional group (which compounds (16), (12), and (13) were used in the reaction), it was possible to obtain (i) a polyimide (22) having 0 mol % of each of the diamine compounds (12) and (13), (ii) a polyimide (22) having 5 mol % of each of the diamine compounds (12) and (13), and (iii) a polyimide (22) having 15 mol % of each of the diamine compounds (12) and (13).

initiator function, was set to be 0. Furthermore, the concentration of the bifunctional monomer (17) in the liquid crystal was set to be 0.3% by weight. Under the circumstances, the liquid crystal cell was irradiated with light with the use of a black light having a peak wavelength of 360 nm, while a voltage was applied to the liquid crystal cell. Then, the liquid crystal cell was further irradiated with light with the use of the black light for 3 hours while no voltage was applied to the liquid crystal cell. The following Table 15 shows results of measurement, which will be described later.

Each of the liquid crystal cells thus produced was placed on a backlight and a voltage was applied to each of the liquid crystal cells in the same manner as Example 1. Then, for each of the liquid crystal cells, a VHR, a residual DC, and an amount of a change in tilt angle were measured in accordance with the method described in Example 1.

TABLE 13

| Contained Amount of Initiator (mol %) | m = 0 (Comparative Example) | m = 5 (Example) | m = 10 (Example) | m = 15 (Example) |
|---|---|---|---|---|
| VHR (%) | 98.1 | 99.5 | 99.5 | 99.5 |
| rDC (mV) | 60 | 10 | 0 | 0 |
| Δ tilt (°) | 0.45 | 0.13 | 0.06 | 0.03 |
| Residual Monomer Ratio (%) | 50 | 0.1 or less | 0.1 or less | 0.1 or less |

As shown in Table 13, by causing the side chain of the alignment layer to have the functional group having the polymerization initiator function, the VHR, the rDC, and the Δ tilt were improved even for an alignment layer having a relatively high imidized ratio. On the other hand, in the case where no initiator was contained in the side chain of the alignment layer (see "m=0 (Comparative Example)" in Table 13), the polymerization of the bifunctional monomer (17) was not developed by irradiation of ultraviolet radiation having a wavelength of 365 nm, and there was a large amount of the residual monomer. As a result, the VHR, the rDC, and the Δ tilt became worse as compared with the present invention, and image sticking was generated.

TABLE 14

| Monomer Concentration (% by weight) | 0 (Comparative Example) | 0.15 (Example) | 0.3 (Example) | 0.6 (Example) |
|---|---|---|---|---|
| VHR (%) | 98.5 | 99.5 | 99.5 | 99.5 |
| rDC (mV) | 160 | 10 | 0 | 0 |
| Δ tilt (°) | 0.58 | 0.07 | 0.06 | 0.03 |
| Residual Monomer Ratio (%) | None | 0.1 or less | 0.1 or less | 0.1 or less |

As shown in Table 14, in the case where the photo-alignment layer having the side chain which had the polymerization initiator function was used, the VHR, the rDC, and the Δ tilt were improved even for the alignment layer having a relatively high imidized ratio, as the concentration of the bifunctional monomer (17) was increased. It seems that the VHR, the rDC, and the Δ tilt were improved because the higher the concentration of the bifunctional monomer (17) became, the less an image sticking property of the photo-alignment layer serving as a base layer had an influence on the liquid crystal, which influence caused the liquid crystal to be unstable. On the other hand, in the case where no bifunctional monomer (17) was used (see "Monomer Concentration"="0 (Comparative Example)" in Table 14), the VHR, the rDC, and the Δ tilt became worse as compared with the present invention, and image sticking was generated.

TABLE 15

| | Comparative Liquid Crystal Cell (Comparative Example) |
|---|---|
| VHR (%) | 98.3 |
| rDC (mV) | 100 |
| Δ tilt (°) | 0.10 |
| Residual Monomer Ratio (%) | 0.1 or less |

As shown in Table 15, no polymerization initiator was used in this comparative example. Nevertheless, it seems that the polymerization of the bifunctional monomer (17) was developed due to an influence of short-wavelength ultraviolet radiation emitted from the black light, and there was substantially no residual monomer. However, as compared with the examples shown in Tables 13 and 14, the VHR, the rDC, and the Δ tilt became worse, and image sticking was generated. It seems that the VHR and the rDC became worse as compared with the case where the alignment layer having the side chain which had the polymerization initiator function was used, because a material constituting the liquid crystal cell was decomposed due to irradiation of a short-wavelength component, and this caused impurities to be mixed in the liquid crystal layer. Further, it seems that the Δ tilt became worse because (i) the alignment layer and the alignment sustaining layer were not covalently bound to each other, and, as a result, (ii) an oligomer or a polymer, derived from the bifunctional monomer (17) contained in the alignment sustaining layer, was separated out into the liquid crystal layer, and (iii) this caused phase separation again due to polymerization.

Example 6

(1) Example of Production of Alignment Layer Material

According to the present example, a polyamic acid (21) having a random structure was obtained in the same manner as Example 2. Further, the following process was carried out so as to imidize the polyamic acid (21) thus obtained. That is, into a γ-butyrolactone solution, an excess of pyridine (0.5 mol) and 0.3 mol of an acetic anhydride were added. Then, the resultant was subjected to reaction for 3 hours at 150° C. A polyimide was thus obtained. The polyimide had a 30,000 weight-average molecular weight and 2.5 molecular weight distribution. Further, an imidized ratio was more than 80%. A polyimide (23) having a vertical alignment group, represented by the following chemical formula, was thus obtained, which polyimide (23) could be used as an alignment layer. In the polyimide (23) thus obtained, a contained amount of each of diamine compounds (12) and (13), each having an initiator function, was 10 mol %.

[Chemical formula 17]

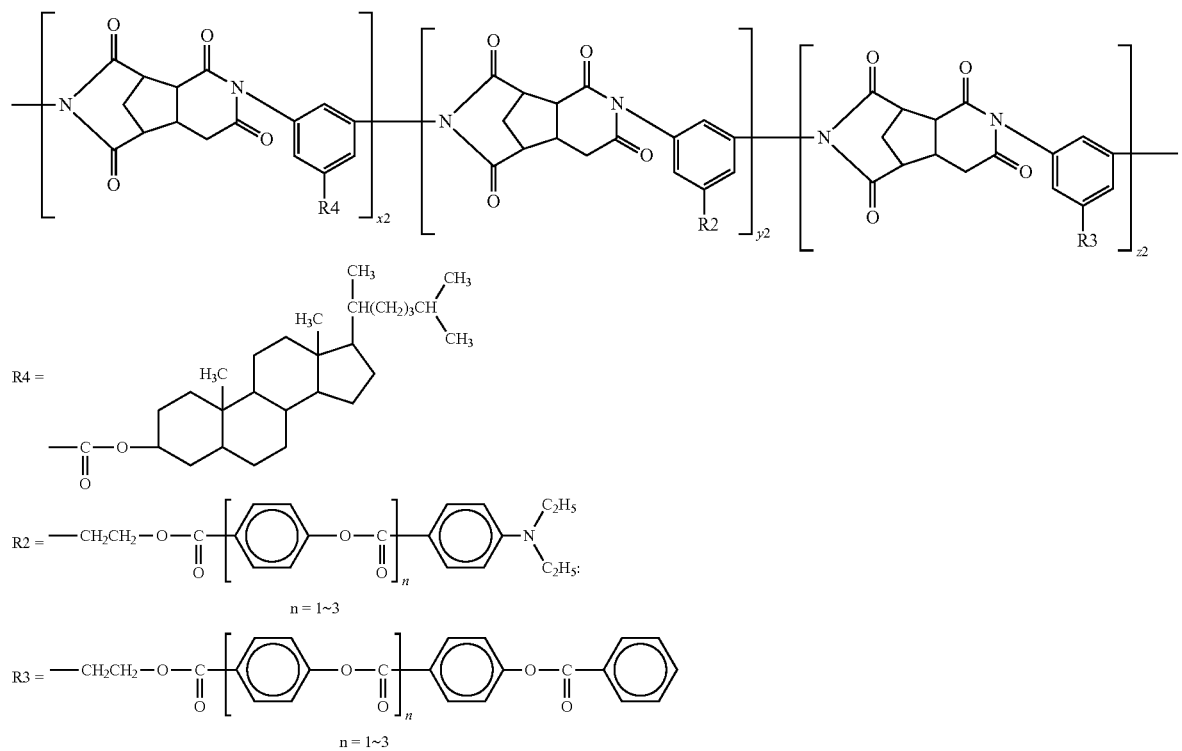

(23)

Further, by adjusting a molar ratio of the diamine compound (18) having a vertical alignment group and each of the diamine compounds (12) and (13), each having the initiator function (which compounds (18), (12), and (13) were used in the reaction), it was possible to obtain (i) a polyimide having the vertical alignment group, in which the contained amount of each of the diamine compounds (12) and (13) each was 0 mol %, (ii) a polyimide having the vertical alignment group, in which the contained amount of each of the compounds (12) and (13) was 5 mol %, and (iii) a polyimide having the vertical alignment group, in which the contained amount of each of the compounds (12) and (13) was 15 mol %.

(2) Example of Production of Liquid Crystal Cell

According to the present example, a liquid crystal cell was produced in accordance with the method described in Example 2, except that the polyimide (23) having the vertical alignment group was used as a material of an alignment layer in place of a polyamic acid (21) having a vertical alignment group.

In each of the first and second alignment layers, a contained amount m of each of the diamine compounds (12) and (13), each having the initiator function, was adjusted to be 0 mol %, 5 mol %, 10 mol %, and 15 mol %, as described above. Further, a concentration of a bifunctional monomer (17) in liquid crystal was set to be 0.3% by weight. The following Table 16 shows results of measurement, which will be described later.

Further, in another measurement, in each of the first and second alignment layers, the contained amount m of each of the diamine compounds (12) and (13), each having the initiator function, was set to be 10 mol %, while the concentration of the bifunctional monomer (17) in the liquid crystal was adjusted to be 0% by weight, 0.15% by weight, 0.3% by weight, and 0.6% by weight. The following Table 17 shows results of measurement, which will be described later.

Further, as a comparative example, a liquid crystal cell was prepared with the use of a conventional material in a conventional manner. Specifically, the contained amount m of each of the diamine compounds (12) and (13), each having the initiator function, was set to be 0. Further, the concentration of the bifunctional monomer (17) in the liquid crystal was set to be 0.3% by weight. Under the circumstances, the liquid crystal cell was irradiated with light with the use of a black light having a peak wavelength of 360 nm while a voltage was applied to the liquid crystal cell. Then, the liquid crystal cell was further irradiated with light with the use of the black light for 3 hours, while no voltage was applied to the liquid crystal cell. The following Table 18 shows results of measurement, which will be described later.

Each of the liquid crystal cells thus produced was placed on a backlight, and a voltage was applied to each of the liquid crystal cells in the same manner as Example 2. Then, for each of the liquid crystal cells, a VHR, a residual DC, and an amount of a change in tilt angle were measured in accordance with the method described in Example 2.

TABLE 16

| Contained Amount of Initiator (mol %) | m = 0 (Comparative Example) | m = 5 (Example) | m = 10 (Example) | m = 15 (Example) |
|---|---|---|---|---|
| VHR (%) | 99.5 | 99.5 | 99.5 | 99.5 |
| rDC (mV) | 0 | −30 | −30 | −40 |
| Δ tilt (°) | 0.54 | 0.12 | 0.08 | 0.05 |
| Residual Monomer Ratio (%) | 70 | 0.1 or less | 0.1 or less | 0.1 or less |

As shown in Table 16, by causing the side chain of the alignment layer to have the functional group having the polymerization initiator function, the VHR, the rDC, and the Δ tilt were significantly improved. On the other hand, in the case where no initiator was contained in the side chain of the alignment layer (see "m=0 (Comparative Example)" in Table 16), polymerization of the bifunctional monomer (17) was not developed by irradiation of ultraviolet radiation having a wavelength of 365 nm, and there was a large amount of the residual monomer. As a result, the VHR, the rDC, and the Δ tilt became worse as compared with the present invention, and image sticking was generated.

TABLE 17

| Monomer Concentration (% by weight) | 0 (Comparative Example) | 0.15 (Example) | 0.3 (Example) | 0.6 (Example) |
|---|---|---|---|---|
| VHR (%) | 99.5 | 99.5 | 99.5 | 99.5 |
| rDC (mV) | No Alignment | −20 | −30 | −30 |
| Δ tilt (°) | No Alignment | 0.18 | 0.03 | 0.03 |
| Residual Monomer Ratio (%) | None | 0.1 or less | 0.1 or less | 0.1 or less |

As shown in Table 17, in the case where the vertical alignment layer having the side chain which had the polymerization initiator function was used, the VHR, the rDC, and the Δ tilt were improved as the concentration of the bifunctional monomer (17) was increased. It seems that the VHR, the rDC, and the Δ tilt were improved because the higher the concentration of the bifunctional monomer (17) became, the more sufficiently the vertical alignment layer which serving as a base layer was covered with an alignment sustaining layer. On the other hand, in the case where no bifunctional monomer (17) was used (see "Monomer Concentration"="0 (Comparative Example)" in Table 17), the VHR, the rDC, and the Δ tilt became worse as compared with the present invention, and image sticking was generated. Note that, in the present example, in a case where the concentration of the bifunctional monomer (17) was 0.15% by weight, the Δ tilt became larger than the Δ tilt obtained when the concentration of the bifunctional monomer (17) was 0.3% by weight. It seems that the Δ tilt became larger because the higher the concentration of the bifunctional monomer (17) became, the more sufficiently the alignment layer serving as the base layer was covered with the alignment sustaining layer.

TABLE 18

| | Comparative Liquid Crystal Cell (Comparative Example) |
|---|---|
| VHR (%) | 98.5 |
| rDC (mV) | 150 |
| Δ tilt (°) | 0.23 |
| Residual Monomer Ratio (%) | 0.3 |

As shown in Table 18, no polymerization initiator was used in this comparative example. Nevertheless, it seems that the polymerization of the bifunctional monomer (17) was developed due to an influence of short-wavelength ultraviolet radiation emitted from the black light, and there was a reduction in the amount of the residual monomer. However, as compared with the examples shown in Tables 16 and 17, the VHR, the rDC, and the Δ tilt became worse, and image sticking was generated. Particularly, the Δ tilt became worse significantly as compared with the examples shown in Tables 16 and 17. It seems that the Δ tilt became worse because the alignment layer and the alignment sustaining layer were not covalently bound to each other, and, as a result, (ii) an oligomer or a polymer, derived from the bifunctional monomer (17) contained in the alignment sustaining layer, was separated out into the liquid crystal layer, and (iii) this caused phase separation again due to polymerization. Further, it seems that, as compared with the case where the alignment layer having the side chain which had the polymerization initiator function was used, the VHR and the rDC became worse, because a material constituting the liquid crystal cell was decomposed due to irradiation of a short-wavelength component, and this caused impurities to be mixed in the liquid crystal layer.

Example 7

The following description deals with an example in which an alignment sustaining layer of the present invention is used in a 4DRTN (4 domain reverse twisted nematic) technique.
(1) Example of Production of Alignment Layer Material
According to the present example, a material constituting an alignment layer was prepared in the same manner as Example 1.
(2) Example of Production of Liquid Crystal Cell
A counter electrode 12 was formed on a surface of a glass substrate 11 (counter color filter substrate), and then, on the counter electrode 12, a first vertical alignment layer made from the same polyamic acid (20) having a photoreactive functional group as that of Example 1 was formed. Further, a pixel electrode 22 was formed on a surface of a glass substrate 21 (TFT substrate), and then, on the pixel electrode 22, a second vertical alignment layer made from the polyamic acid (20) having the photoreactive functional group was formed (see FIG. 1). Note that, according to the present example, an electrode 42 having a comb-like structure, illustrated in FIG. 2, was used as the pixel electrode 22.

Next, a photo-alignment process was carried out by irradiation of P polarized light having a peak wavelength (center) of 330 nm at 50 mJ/cm$^2$ in such a manner that (i) a half of a region of the TFT substrate was irradiated with the P polarized light in a direction at 40° with respect to a normal line of the TFT substrate and at an azimuth angle of 0°, (ii) the other half of the region of the TFT substrate was irradiated with the P polarized light in a direction at 40° with respect to the normal direction of the TFT substrate and at an azimuth angle of 180°, (iii) a half of a region of the counter color filter substrate was irradiated with the P polarized light in a direction at 40° with respect to a normal direction of the counter color filter substrate and at an azimuth angle of 90°, and (iv) the other half of the region of the counter color filter substrate was irradiated with the P polarized light in a direction at 40° with respect to the normal line of the counter color filter substrate and at an azimuth angle of 270°.

Then, the TFT substrate and the counter color filter substrate were attached to each other so that (i) a cell thickness was 4 microns, and (ii) a twisted angle of liquid crystal molecules was 90°. After that, liquid crystal having negative dielectric anisotropy (Δ∈) was provided between the TFT substrate and the counter color filter substrate. In addition to the liquid crystal molecules, 0.3% by weight of a bifunctional monomer (17) which was a material of an alignment sustaining layer was contained in the liquid crystal. After the liquid crystal was provided, the substrates were heated at 130° C., and then rapidly cooled. After that, a liquid crystal cell was irradiated with light with the use of a black light having a peak wavelength (center) of 360 nm for 2 hours, so that the bifunctional monomer (17) was subjected to polymerization reaction (see Example 1). A liquid crystal panel in which 4 divisional regions (i.e., 4 domains) were realized was thus produced.

The liquid crystal panel thus produced was tested while a voltage is applied to the liquid crystal panel and the backlight was turned on. As a result, no image sticking was generated.

According to the present example, the electrode 42 having the comb-like shape was used in the 4DRTN technique. Note, however, that, in the present example, it is possible to use a plane electrode in place of the electrode having the comb-like shape. With the arrangement in which such a plane electrode and the alignment sustaining layer of the present invention are used, it is also possible to have the same effects as those obtained with the arrangement employing the electrode having the comb-like shape.

Example 8

(1) Example of Production of Alignment Layer Material

In the present example, a material constituting an alignment layer was prepared in the same manner as Example 1.

(2) Example of Production of Liquid Crystal Cell

In the same manner as Example 1, a counter electrode 12 was formed on a surface of a glass substrate 11, and a first vertical alignment layer made from a polyamic acid (20) having a photoreactive functional group was formed on the counter electrode 12. Further, a pixel electrode 22 was formed on a surface of a glass substrate 21, and a second vertical alignment layer made from the polyamic acid (20) having the photoreactive functional group was formed on the pixel electrode 22 (see FIG. 1). Next, a photo-alignment process was carried out in such a manner that each of the glass substrates 11 and 21 was irradiated with linearly polarized light in an oblique direction.

Then, a sealing material was applied to a periphery section of the glass substrate 21, and beads were dispersed on the surface of the glass substrate 11, which surface faced the glass substrate 21, and on which surface the first alignment layer had been formed. After that, the glass substrates 21 and 11 were attached to each other, and then, liquid crystal having negative dielectric anisotropy was provided between the glass substrates 21 and 11. In addition to liquid crystal molecules, the following bifunctional monomer (24) which was a material of an alignment sustaining layer was mixed in and dissolved in the liquid crystal. After the liquid crystal was provided, the substrates were heated at 130° C. and then rapidly cooled. And then, a liquid crystal cell thus obtained was irradiated with light with the use of a black light having a peak wavelength of 360 nm for 2 hours, so that the bifunctional monomer (24) was subjected to polymerization reaction. Note that no voltage was applied to the liquid crystal cell during the polymerization reaction.

[Chemical Formula 18]

(24)

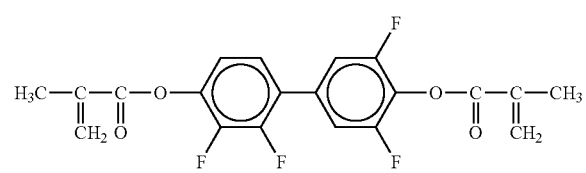

Note that the bifunctional monomer (24) was represented by the general formula (1) shown at the beginning of "Description of Embodiments" of the present specification, wherein: both $P^1$ and $P^2$ represent a methacrylate group; $S^1$ represents direct binding between $P^1$ and $A^1$; both $A^1$ and $A^2$ represent a 1,4-phenylene group in which a part of hydrogen atoms is substituted by a fluorine atom(s); $Z^1$ represents direct binding between $A^1$ and $A^2$; $S^2$ represents direct binding between $P^2$ and $A^2$; and n is 1.

In each of the first and second alignment layers, a contained amount m of each of diamine compounds (12) and (13), each having an initiator function, was adjusted to be 0 mol %, 5 mol %, 10 mol %, and 15 mol %. Further, here, a concentration of the bifunctional monomer (24) in the liquid crystal was set to be 0.6% by weight. The following Table 19 shows results of measurement, which will be described later.

Further, in another measurement, in each of the first and second alignment layers, the contained amount m of each of the diamine compounds (12) and (13), each having an initiator function, was set to be 5 mol %, while the concentration of the bifunctional monomer (24) was adjusted to be 0% by weight, 0.3% by weight, 0.6% by weight, and 1.0% by weight. The following Table 20 shows results of measurement, which will be described later.

Each of the liquid crystal cells thus prepared was placed on a backlight, and a voltage was applied to each of the liquid crystal cells in the same manner as Example 1. Then, a VHR, a residual DC, and an amount of a change in tilt angle were measured in accordance with the method described in Example 1.

TABLE 19

| Contained Amount of Initiator (mol %) | m = 0 (Comparative Example) | m = 5 (Example) | m = 10 (Example) | m = 15 (Example) |
|---|---|---|---|---|
| VHR (%) | 94.8 | 99.3 | 99.4 | 99.4 |
| rDC (mV) | 430 | 10 | 10 | 10 |
| Δ tilt (°) | 0.19 | 0.03 | 0.03 | 0.03 |
| Residual Monomer Ratio (%) | 30 | 0.1 or less | 0.1 or less | 0.1 or less |

TABLE 20

| Monomer Concentration (% by weight) | 0 (Comparative Example) | 0.3 (Example) | 0.6 (Example) | 1.0 (Example) |
|---|---|---|---|---|
| VHR (%) | 94.5 | 99.0 | 99.3 | 99.3 |
| rDC (mV) | 500 | 20 | 10 | 10 |
| Δ tilt (°) | 0.15 | 0.03 | 0.03 | 0.03 |
| Residual Monomer Ratio (%) | None | 0.1 or less | 0.1 or less | 0.1 or less |

Example 9

(1) Example of Production of Alignment Layer Material

In the present example, a material constituting an alignment layer was prepared in the same manner as Example 3 (i.e., Example 1).

(2) Example of Production of Liquid Crystal Cell

In the same manner as Example 3, a counter electrode 12 was formed on a surface of a glass substrate 11, and a first vertical alignment layer made from a polyamic acid (20) having a photoreactive functional group was formed on the counter electrode 12. Further, a pixel electrode 22 was formed on a surface of a glass substrate 21, and a second vertical alignment layer made from the polyamic acid having the photoreactive functional group was formed on the pixel electrode 22 (see FIG. 1). Next, a photo-alignment process was carried out in such a manner that each of the glass substrates 11 and 21 was irradiated with linearly polarized light in an oblique direction.

Next, a sealing material was applied to a periphery section of the glass substrate 21, and beads were dispersed on the surface of the glass substrate 11, which surface faced the glass substrate 21, and on which surface the first vertical alignment layer had been formed. After that, the glass substrates 21 and 11 were attached to each other, and then, liquid crystal having negative dielectric anisotropy was provided between the glass substrates 21 and 11. In addition to liquid crystal molecules, the following bifunctional monomer (25) which was a material of an alignment sustaining layer was mixed in and dissolved in the liquid crystal. After the liquid crystal was provided, the substrates were heated at 130° C., and then, rapidly cooled. After that, a liquid crystal cell thus obtained was irradiated with light with the use of a black light having a peak wavelength of 360 nm for 2 hours, so that the bifunctional monomer (25) was subjected to polymerization reaction. Note that no voltage was applied to the liquid crystal cell during the polymerization reaction.

[Chemical Formula 19]

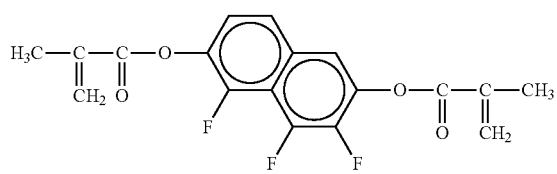

(25)

The bifunctional monomer (25) was represented by the general formula (1) shown at the beginning of "Description of Embodiments" of the present specification, wherein: both $P^1$ and $P^2$ represent a methacrylate group; $S^1$ represents direct binding between $P^1$ and $A^1$; $A^1$ represents a naphthalene-2,6-dyil group in which a part of hydrogen atoms is substituted by a fluorine atom(s); $S^2$ represents direct binding between $P^2$ and $A^2$ (here, since n is 0 as described below, $A^1$ and $P^2$ are directly bound to each other); and n is 0.

In each of the first and second alignment layers, a contained amount m of each of diamine compounds (12) and (13), each having an initiator function, was adjusted to be 0 mol %, 5 mol %, 10 mol %, and 15 mol %. Further, here, a concentration of the bifunctional monomer (25) in the liquid crystal was set to be 0.6% by weight. The following Table 21 shows results of measurement, which will be described later.

Further, in another measurement, in each of the first and second alignment layers, the contained amount m of each of the diamine compounds (12) and (13), each having the initiator function, was set to be 5 mol %, while the concentration of the bifunctional monomer (25) was adjusted to be 0% by weight, 0.3% by weight, 0.6% by weight, and 1.0% by weight. The following Table 22 shows results of measurement, which will be described later.

Each of the liquid crystal cells thus produced was placed on a backlight, and a voltage was applied to each of the liquid crystal cells in the same manner as Example 3. Then, a VHR, a residual DC, and an amount of a change in tilt angle were measured in accordance with the method described in Example 3.

TABLE 21

| Contained Amount of Initiator (mol %) | m = 0 (Comparative Example) | m = 5 (Example) | m = 10 (Example) | m = 15 (Example) |
|---|---|---|---|---|
| VHR (%) | 95.5 | 99.5 | 99.5 | 99.5 |
| rDC (mV) | 450 | 10 | 0 | 0 |
| Δ tilt (°) | 0.18 | 0.04 | 0.03 | 0.02 |
| Residual Monomer Ratio (%) | 50 | 0.1 or less | 0.1 or less | 0.1 or less |

TABLE 22

| Monomer Concentration (% by weight) | 0 (Comparative Example) | 0.3 (Example) | 0.6 (Example) | 1.0 (Example) |
|---|---|---|---|---|
| VHR (%) | 95.3 | 99.5 | 99.5 | 99.5 |
| rDC (mV) | 480 | 10 | 10 | 0 |
| Δ tilt (°) | 0.15 | 0.05 | 0.04 | 0.04 |
| Residual Monomer Ratio (%) | None | 0.1 or less | 0.1 or less | 0.1 or less |

Other than the bifunctional monomers specifically described in the aforementioned Examples 1 through 9, bifunctional monomers (26), (27), (28), and (29), represented by the following formulas, respectively, can be suitably used as the material of the alignment sustaining monomer of the present invention, for example.

[Chemical Formula 20]

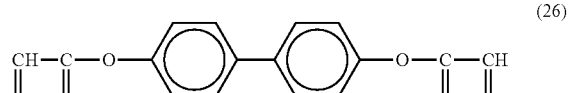

(26)

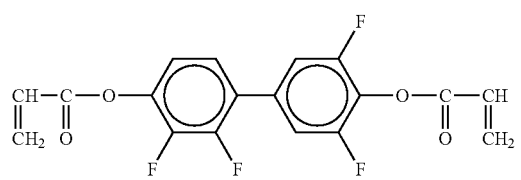

(27)

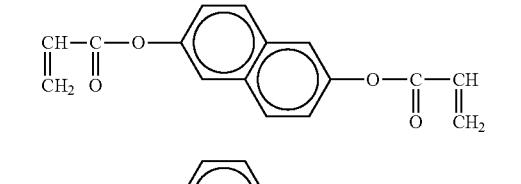

(28)

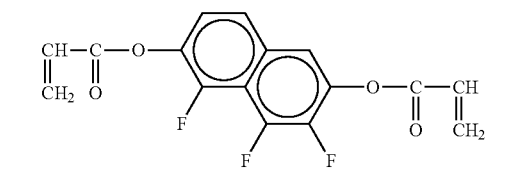

(29)

Note that the bifunctional monomer (26) was represented by the general formula (1) shown at the beginning of "Description of Embodiments" of the present specification, wherein: both $P^1$ and $P^2$ represent an acrylate group; $S^1$ represents direct binding between $P^1$ and $A^1$; both $A^1$ and $A^2$ represent a 1,4-phenylene group; $Z^1$ represents direct binding between $A^1$ and $A^2$; $S^2$ represents direct binding between $P^2$ and $A^2$; and n is 1. Further, the bifunctional monomer (27) is such that a part of hydrogen atoms of the 1,4-phenylene group is substituted by a fluorine atom(s) in the bifunctional monomer (26).

Further, the bifunctional monomer (28) was represented by the general formula (1) shown at the beginning of "Description of Embodiments" of the present specification, wherein: both $P^1$ and $P^2$ represent an acrylate group; $S^1$ represents direct binding between $P^1$ and $A^1$; $A^1$ represents a naphthalene-2,6-dyil group; $S^2$ represents direct binding between $P^2$ and $A^2$ (here, since n is 0 as described below, $A^1$ and $P^2$ are directly bound to each other); and n is 0. Further, the bifunctional monomer (29) is such that a part of hydrogen atoms of the naphthalene-2,6-dyil group is substituted by a fluorine atom(s) in the bifunctional monomer (28).

Moreover, other than the bifunctional monomers specifically described in the aforementioned Examples 1 through 9, bifunctional monomers (30) through (37), represented by the following chemical formulas, respectively, can be suitably used as the material of the alignment sustaining layer of the present invention, for example.

[Chemical Formula 21]

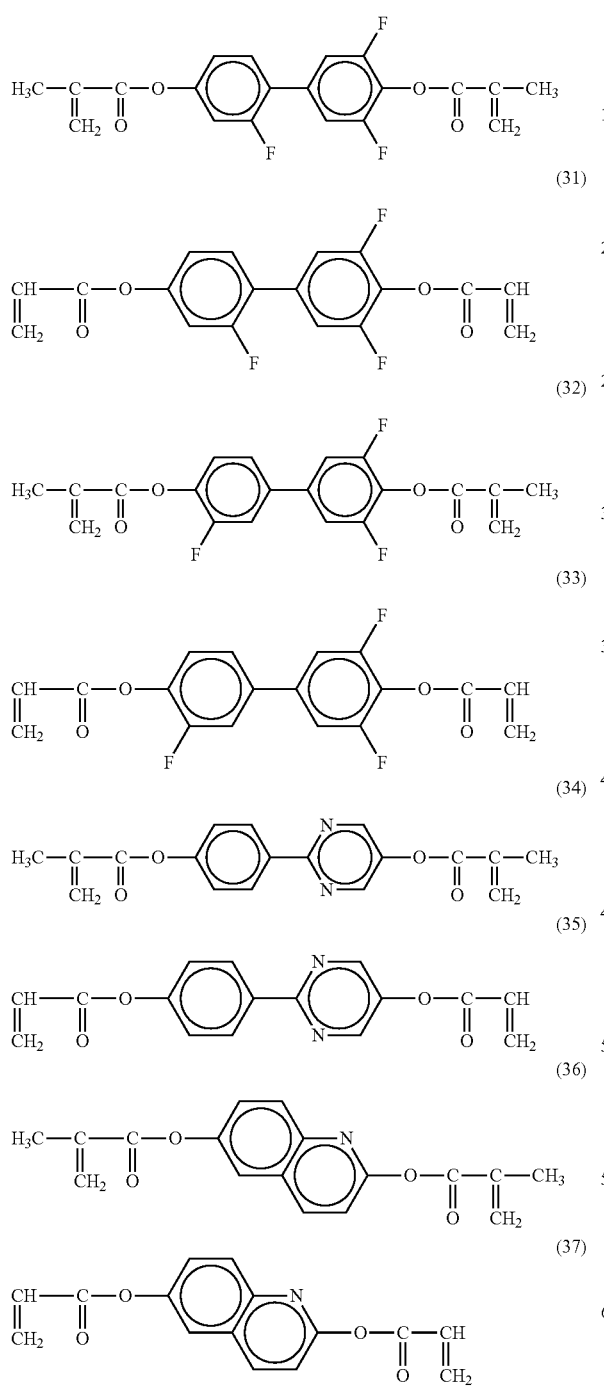

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be used as, for example, a liquid crystal display device in which generation of image sticking due to a change in pretilt angle, or generation of image sticking due to electricity is prevented.

REFERENCE SIGNS LIST 11, 21: Glass substrate (substrate)
23: Alignment layer
24: Alignment sustaining layer
30: Liquid crystal layer
40: Pixel
41: Domain
100: Liquid crystal display device

The invention claimed is:

1. A liquid crystal display device comprising:
a pair of substrates;
a liquid crystal layer provided between the pair of substrates;
an alignment layer provided between at least one of the pair of the substrates and the liquid crystal layer; and
an alignment sustaining layer for defining a direction in which liquid crystal molecules constituting the liquid crystal layer are inclined, the alignment sustaining layer being provided between the alignment layer and the liquid crystal layer, and formed from a monomer component,
the alignment layer containing a polyimide or a polyamic acid,
the alignment layer and the alignment sustaining layer being covalently bound to each other such that (i) the polyimide or the polyamic acid has a polymerization initiator functional group having a function of initiating polymerization reaction of the monomer component for forming the alignment sustaining layer, and (ii) the polymerization initiator functional group and the polymerized monomer component are covalently bound to each other.

2. The liquid crystal display device as set forth in claim 1, wherein:
the alignment sustaining layer is made from a polymer having a cross-linked structure.

3. The liquid crystal display device as set forth in claim 1, wherein:
the alignment sustaining layer is formed by polymerizing a monomer component containing a monomer represented by the following general formula (1):

(wherein: $P^1$ and $P^2$ represent an acrylate group, a methacrylate group, an acrylamide group, a methacrylamide group, a vinyl group, a vinyloxy group, or an epoxy group, independently; $A^1$ and $A^2$ represent a 1,4-phenylene group, a naphthalene-2,6-diyl group, a group in which a part of carbon atoms is substituted by a hetero atom(s) in the 1,4-phenylene group, or a group in which a part of carbon atoms is substituted by a hetero atom(s) in the naphthalene-2,6-diyl group, independently; a hydrogen atom(s) may be substituted by a halogen atom(s) or a methyl group in any one of the 1,4-phenylene group, the naphthalene-2,6-diyl group, the group in which a part of carbon atoms is substituted by a hetero atom(s) in the 1,4-phenylene group, and the group in which a part of carbon atoms is substituted by a hetero atom(s) in the naphthalene-2,6-diyl group; $Z^1$ represents —COO—, —OCO—, —O—, —NHCO—, or direct binding between $A^1$ and $A^2$; $S^1$ and $S^2$ represent —$(CH)_m$—, —$(CH_2—CH_2—O)_m$—, direct binding between $P^1$ and $A^1$ (in the case of $S^1$), or direct binding between $P^2$ and $A^2$ (or direct binding between $P^2$ and $A^1$ in a case where n is 0) (in the case of $S^2$), independently, where m is an integer of not less than 1 but not more than 6; and n is 0, 1, or 2).

4. The liquid crystal display device as set forth in claim 3, wherein:

in the general formula (1), both $P^1$ and $P^2$ represent a methacrylate group or an acrylate group;

$Z^1$ represents the direct binding between $A^1$ and $A^2$; and n is 0 or 1.

5. The liquid crystal display device as set forth in claim 3, wherein:

in the general formula (1), $A^1$ is selected from the group consisting of a 1,4-phenylene group, a 2-fluoro-1,4-phenylene group, a 2,3-difluoro-1,4-phenylene group, a 2,6-difluoro-1,4-phenylene group, a naphthalene-2,6-diyl group, a 3,4,5-trifluoronaphthalene-2,6-diyl group, and a group in which, in any one of the aforementioned groups, a part of carbon atoms is substituted by a nitrogen atom(s) serving as a hetero atom(s).

6. The liquid crystal display device as set forth in claim 1, wherein:

the polymerization initiator functional group generates a radical by being irradiated with ultraviolet radiation having a wavelength of more than 330 nm but not more than 400 nm, so as to initiate the polymerization reaction of the monomer component.

7. The liquid crystal display device as set forth in claim 6, wherein:

the polyimide or the polyamic acid has, as the polymerization initiator functional group, both an amine and an aromatic ketone.

8. The liquid crystal display device as set forth in claim 1, wherein:

the polyimide or the polyamic acid contains a photoreactive functional group for causing, by being irradiated with light, the liquid crystal molecules constituting the liquid crystal layer to be aligned in a predetermined direction.

9. The liquid crystal display device as set forth in claim 8, wherein:

the photoreactive functional group is at least one sort selected from the group consisting of a cinnamate group, a chalkone group, a tolan group, a coumarin group, and an azobenzene group.

10. The liquid crystal display device as set forth in claim 1, wherein:

the polyimide or the polyamic acid has a structure represented by the following general formula (2) or (3):

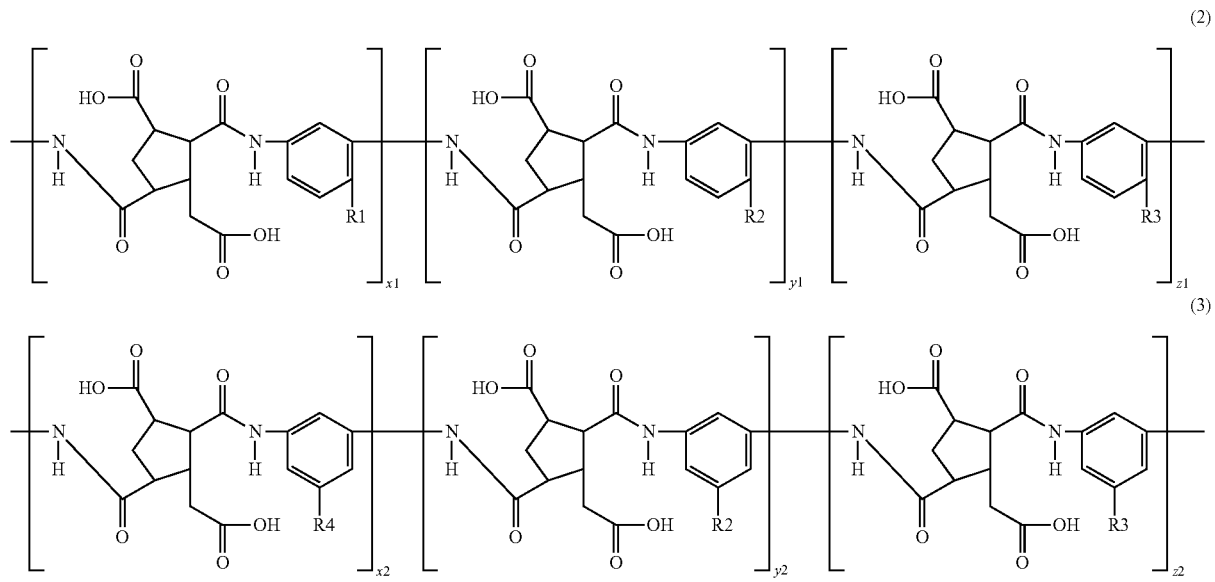

(wherein: R1 and R4 independently represent (i) a photoreactive functional group for causing, by being irradiated with light, the liquid crystal molecules constituting the liquid crystal layer to be aligned in a predetermined direction or (ii) a vertical alignment functional group for causing the liquid crystal molecules to be subjected to vertical alignment; R2 and R3 represent different polymerization initiator functional groups, respectively, each of which has a function of initiating the polymerization reaction of the monomer component for forming the alignment sustaining layer; x1, x2, y1, y2, z1, and z2 represent the number of corresponding repeat units, independently, which number is not less than 1; a carboxyl group contained in each repeat unit may be imidized at a predetermined ratio; and repeat units of different sort may be arranged randomly).

11. A method of manufacturing a liquid crystal display device including a pair of substrates, a liquid crystal layer provided between the pair of substrates, an alignment layer provided between the liquid crystal layer and at least one of the pair of substrates, and an alignment sustaining layer for defining a direction in which liquid crystal molecules constituting the liquid crystal layer are inclined, the alignment sustaining layer being provided between the alignment layer and the liquid crystal layer, the method comprising the steps of:

causing a monomer component for forming the alignment sustaining layer, and the alignment layer to be in contact with each other, the alignment layer containing a polyimide or a polyamic acid, the polyimide or the polyamic acid having a polymerization initiator functional group having a function of initiating polymerization reaction of the monomer component; and forming the alignment sustaining layer between the alignment layer and the liquid crystal layer by carrying out the polymerization reaction of the monomer component initiated by the polymerization initiator functional group, the polymerization initiator functional group and the monomer component bonding covalently to each other so that the alignment sustaining layer and the alignment layer are covalently bound to each other.

12. The method as set forth in claim 11, wherein:

the monomer component is dissolved in the liquid crystal molecules constituting the liquid crystal layer.

13. The method as set forth in claim 12, wherein:

the polymerization reaction of the monomer component is initiated by irradiation of light.

\* \* \* \* \*